United States Patent [19]

Fukuyama et al.

[11] Patent Number: 5,278,581
[45] Date of Patent: Jan. 11, 1994

[54] PRINTER FOR PRINTING AND IMAGE FORMED OF 2-DIMENSIONALLY ARRANGED PIXELS, AND METHOD OF PRINTING THE SAME

[75] Inventors: Hirotaka Fukuyama; Tetsuya Nakamura; Haruki Kinoshita; Masayoshi Aihara; Katsumi Murano; Masanori Terasaki; Toshihiko Nannichi, all of Tokyo, Japan

[73] Assignee: Kabushiki Kaisha Toshiba, Kawasaki, Japan

[21] Appl. No.: 750,473

[22] Filed: Aug. 27, 1991

[30] Foreign Application Priority Data

| Sep. 17, 1990 [JP] | Japan | 2-246438 |
|---|---|---|
| Nov. 20, 1990 [JP] | Japan | 2-312608 |
| Nov. 20, 1990 [JP] | Japan | 2-312609 |
| Nov. 20, 1990 [JP] | Japan | 2-312610 |
| Nov. 20, 1990 [JP] | Japan | 2-312611 |

[51] Int. Cl.$^5$ .................. H04N 1/21; B41J 2/435
[52] U.S. Cl. ..................... 346/108; 358/298
[58] Field of Search .......... 346/108, 107 R, 76 L 160; 358/298, 358/296, 300, 302

[56] References Cited

U.S. PATENT DOCUMENTS

| 3,836,917 | 9/1974 | Mee | 354/5 |
|---|---|---|---|
| 4,679,039 | 7/1987 | Neil et al. | 358/298 |
| 4,916,465 | 4/1990 | Van Tongeren et al. | 346/76 L |
| 4,958,239 | 9/1990 | Yamada et al. | 358/298 |
| 5,017,944 | 5/1991 | Kitamura et al. | 358/298 |
| 5,075,780 | 12/1991 | Shibahara | 358/298 |
| 5,134,495 | 7/1992 | Frazier et al. | 358/298 |
| 5,155,598 | 10/1992 | Ramekers et al. | 358/298 |

FOREIGN PATENT DOCUMENTS

| 0088555 | 9/1983 | European Pat. Off. |
|---|---|---|
| 3618031 | 5/1986 | Fed. Rep. of Germany |
| 2082815 | 3/1982 | United Kingdom |

Primary Examiner—Mark J. Reinhart
Attorney, Agent, or Firm—Finnegan, Henderson, Farabow, Garrett & Dunner

[57] ABSTRACT

A printer has a shift register, an emission-time setting section, a laser diode, and a drive section. The register supplies the emission-time setting section with bits representing consecutive pixels including at least one black pixel. The emission-time setting section determines the period of time during which the drive section is to drive the laser diode, from the pixel patterns represented by the bits supplied from the register, and outputs an emission-time signal which represents said period of time. In response to the emission-time signal, the drive section drives the laser diode for the period of time, whereby a black pixel of a desired size is formed on a printing medium.

25 Claims, 22 Drawing Sheets

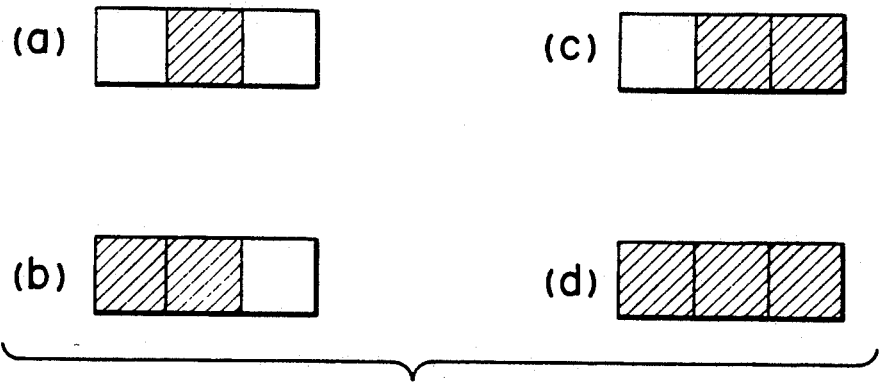
F I G. 5

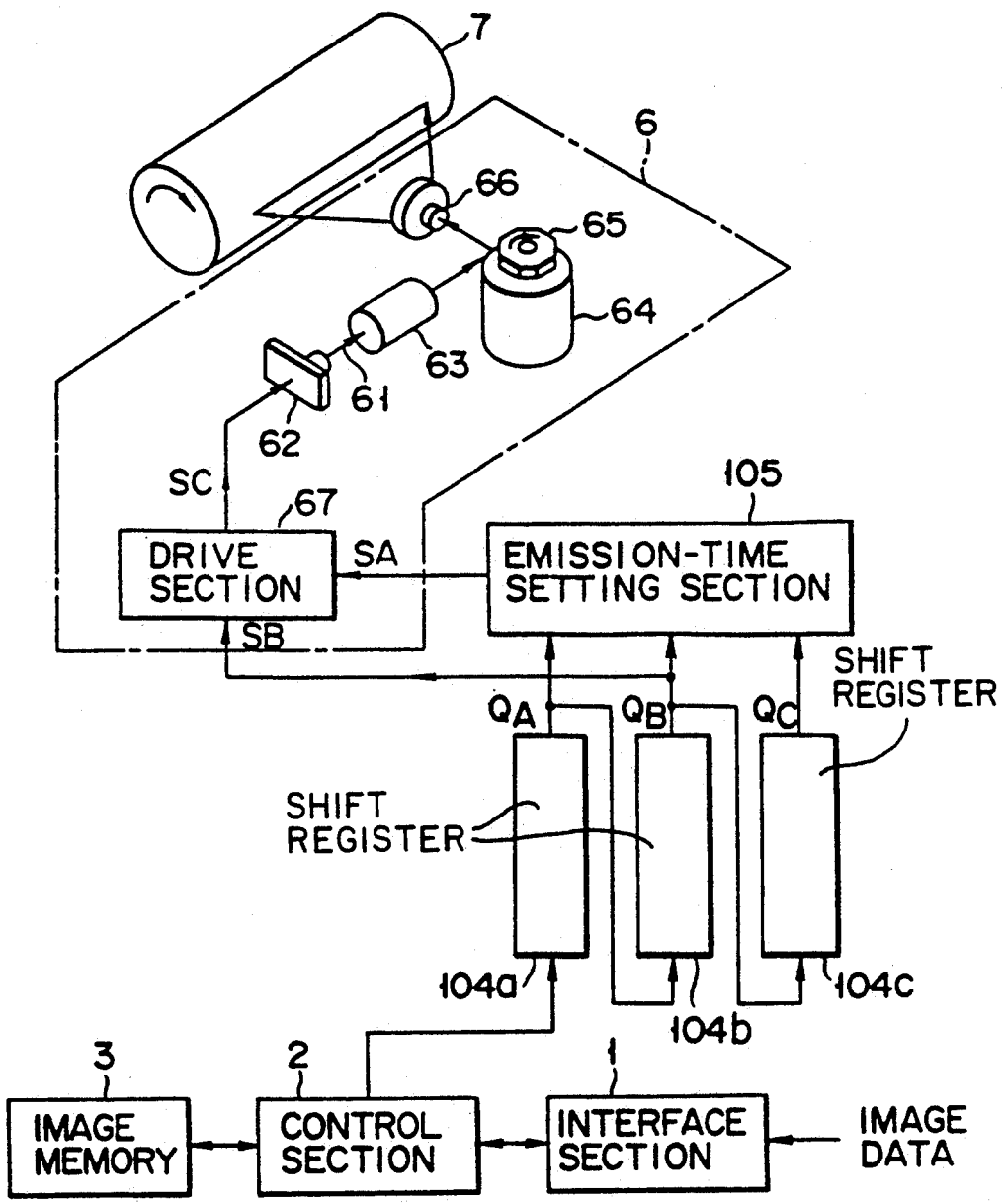
F I G. 10

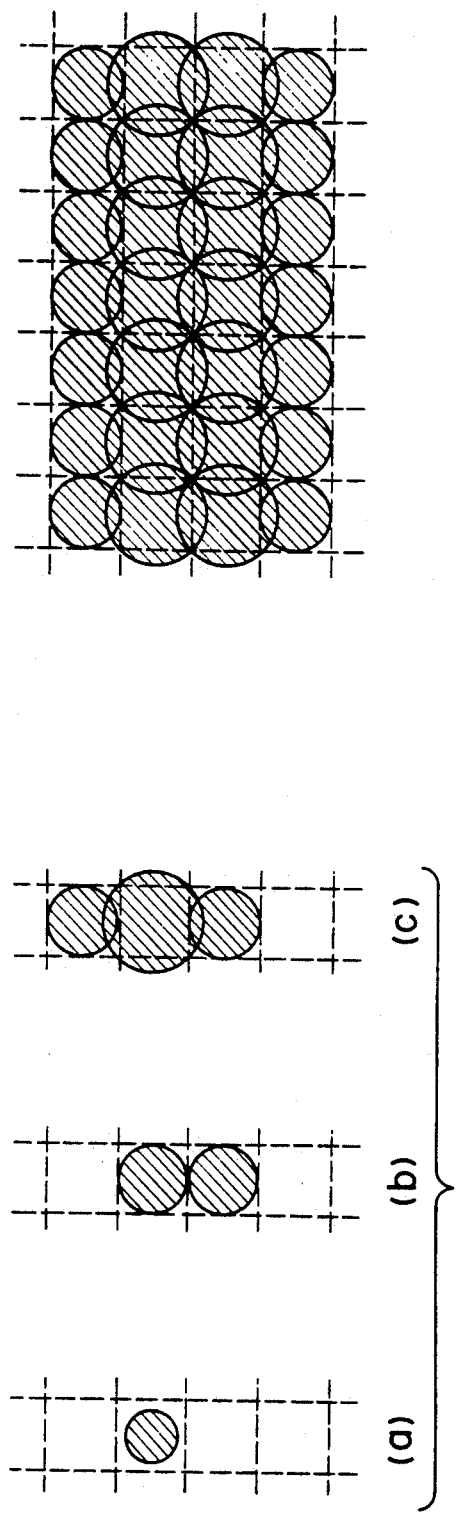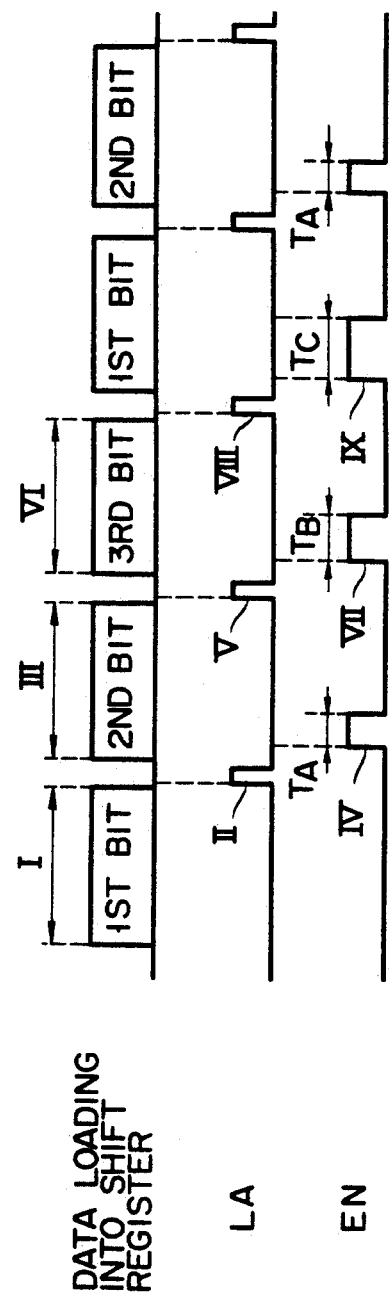
F I G. 15
F I G. 14
F I G. 17

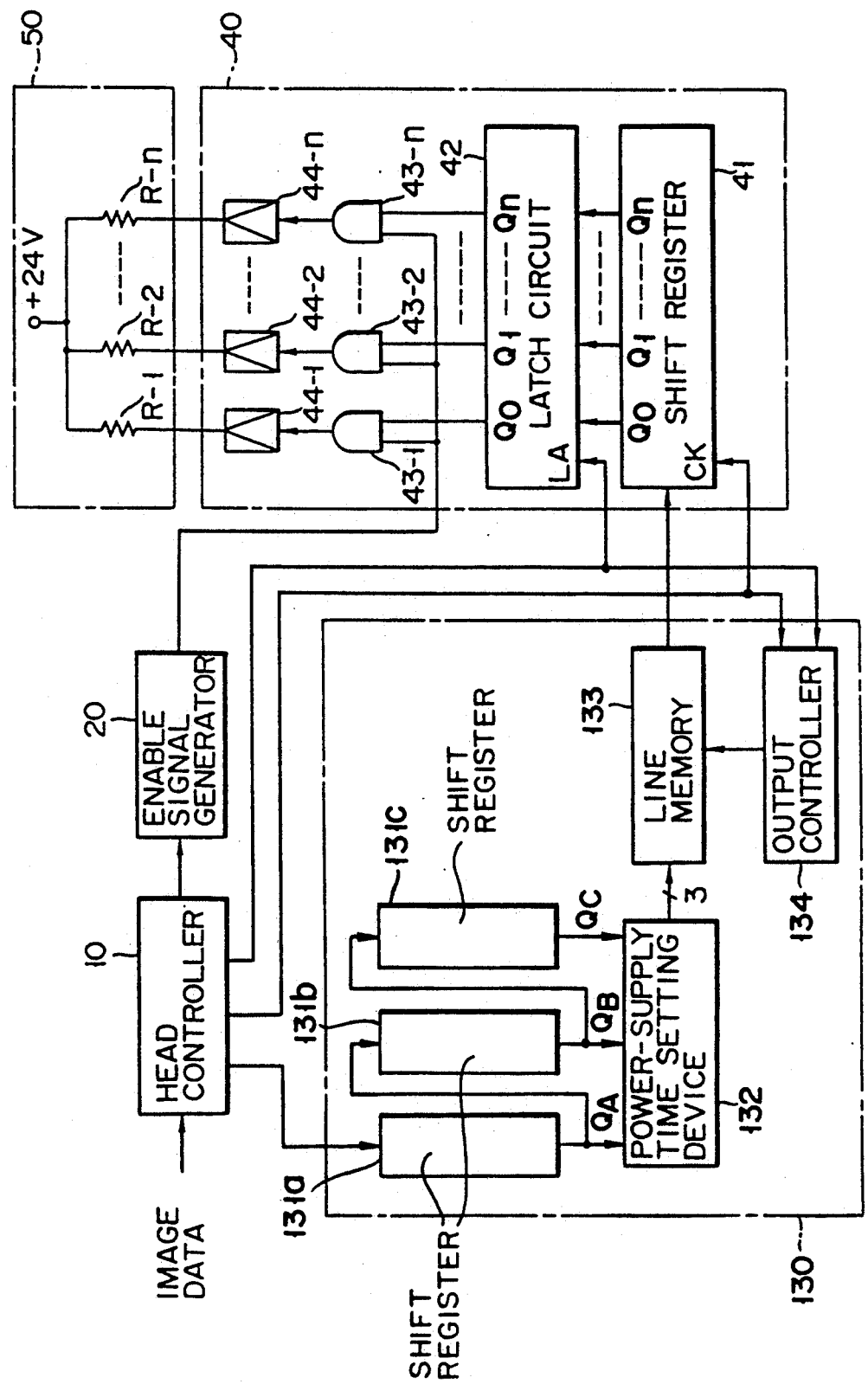
F I G. 16

| QD | QB | QE | QA | QC | |
|---|---|---|---|---|---|
| 0 | 1 | 0 | 0 | 0 | A |
| 1 | 1 | 0 | 0 | 0 | A |
| 0 | 1 | 1 | 0 | 0 | A |
| 0 | 1 | 0 | 1 | 0 | A |
| 0 | 1 | 0 | 0 | 1 | A |
| 1 | 1 | 1 | 0 | 0 | B |
| 1 | 1 | 0 | 1 | 0 | B |
| 1 | 1 | 0 | 0 | 1 | B |
| 0 | 1 | 1 | 1 | 0 | B |
| 0 | 1 | 1 | 0 | 1 | B |
| 0 | 1 | 0 | 1 | 1 | B |
| 1 | 1 | 1 | 1 | 0 | B |
| 1 | 1 | 1 | 0 | 1 | B |
| 1 | 1 | 0 | 1 | 1 | B |
| 0 | 1 | 1 | 1 | 1 | B |
| 1 | 1 | 1 | 1 | 1 | C |
F I G. 19
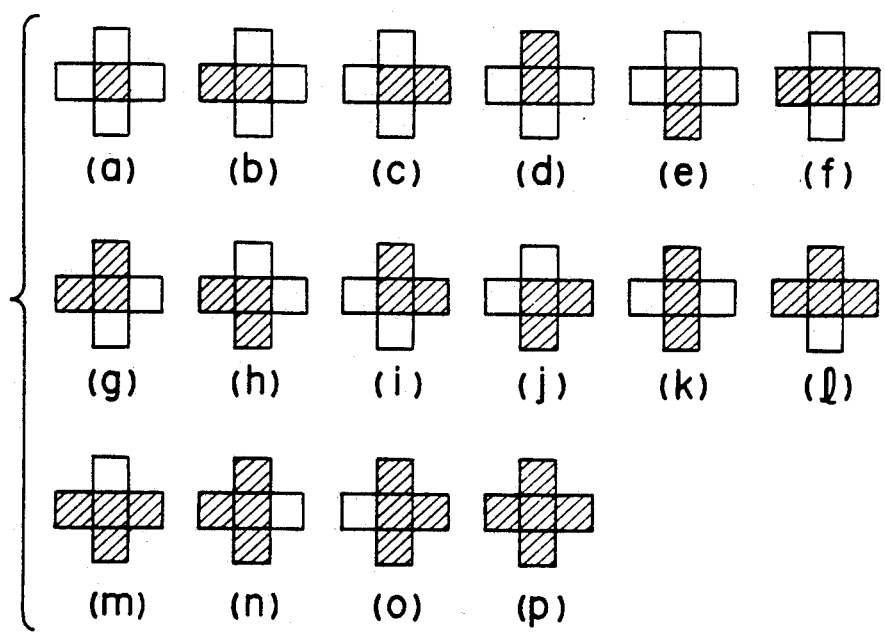
F I G. 20

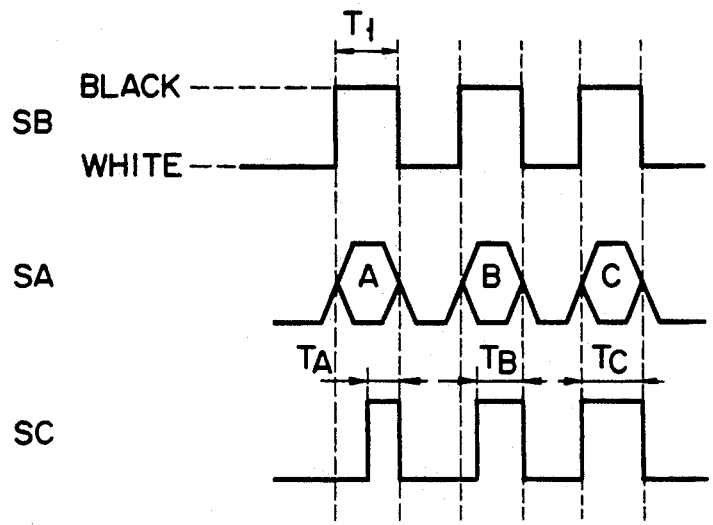
F I G. 21
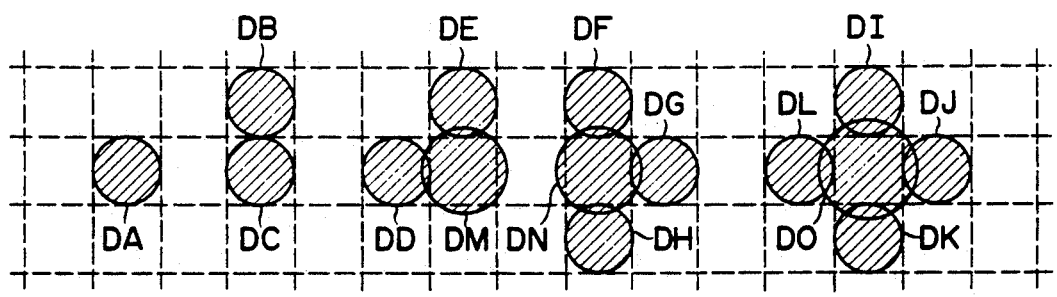
F I G. 22

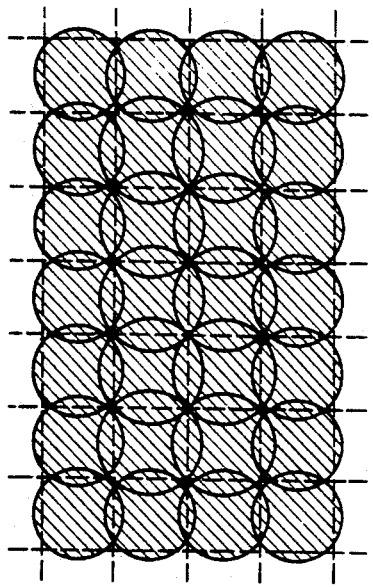
F I G. 23
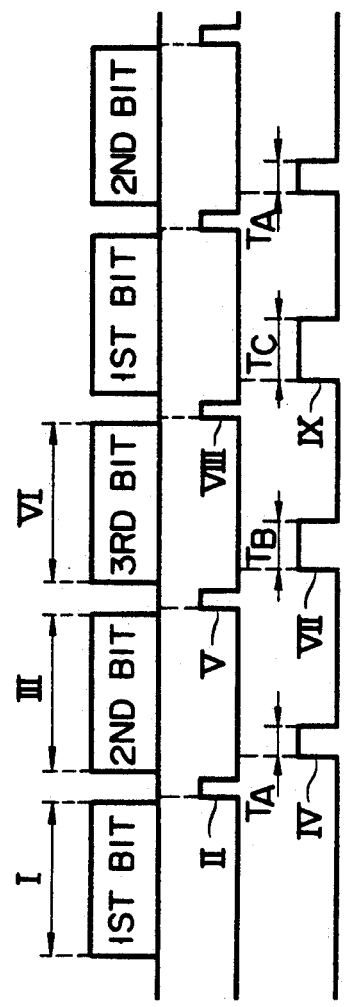
F I G. 25

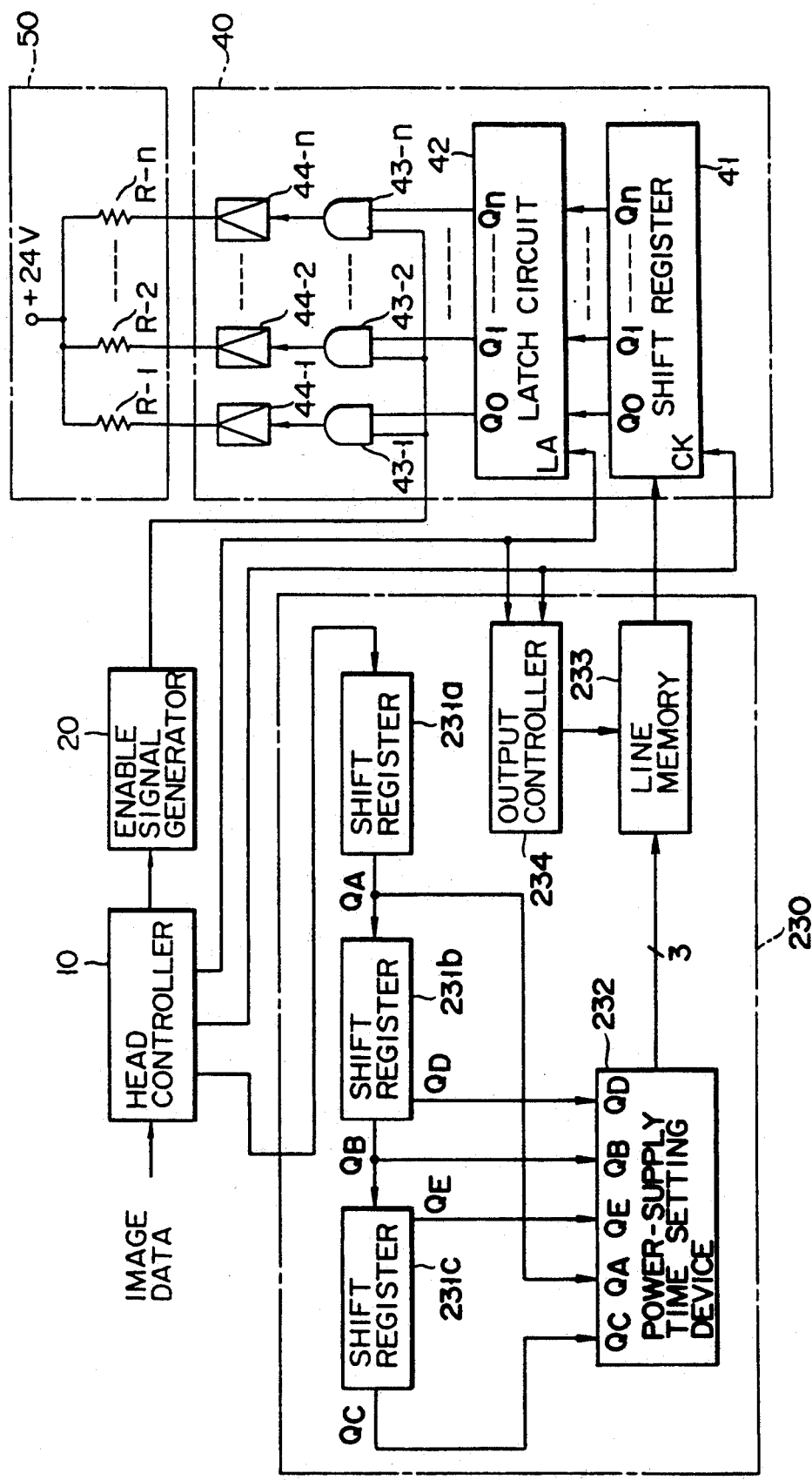
F I G. 24

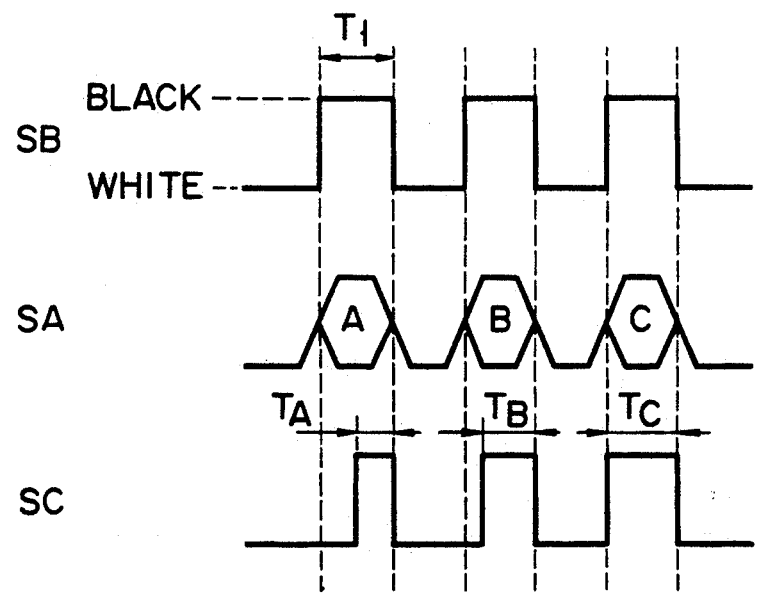
F I G. 27
F I G. 28

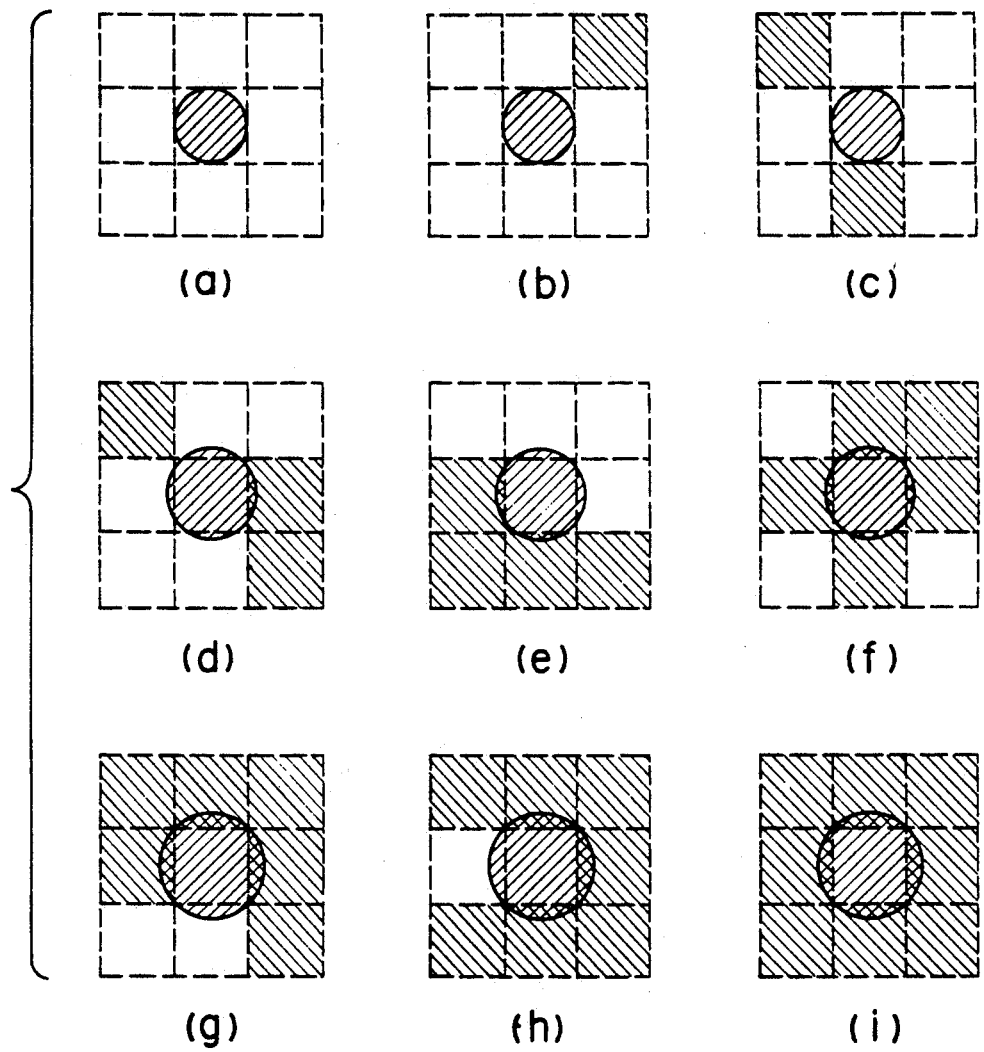
F I G. 29

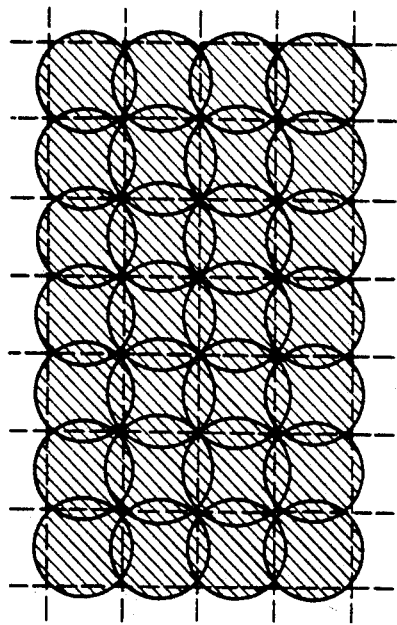
F I G. 30
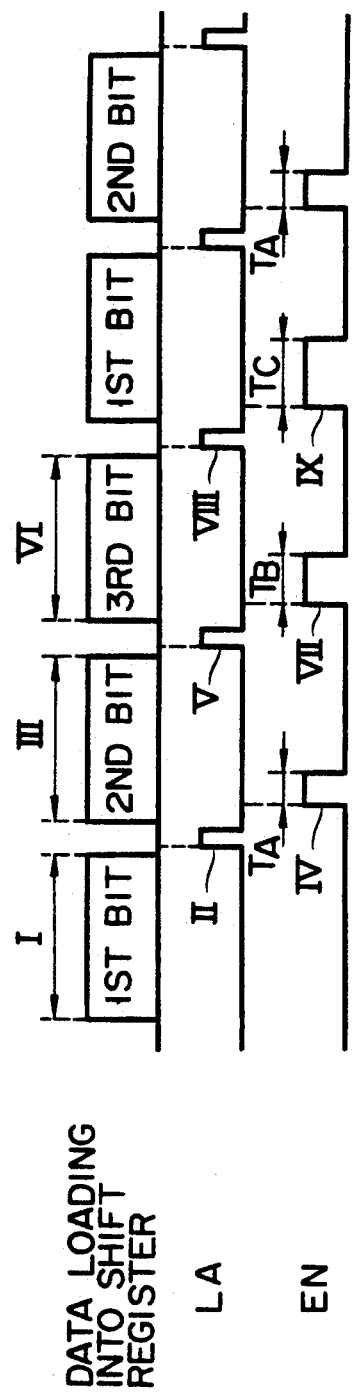
F I G. 32

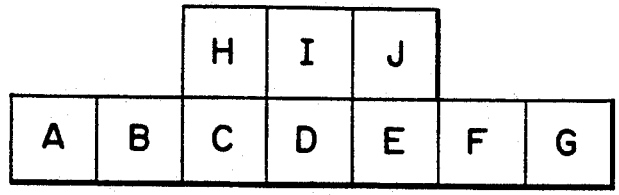
F I G. 34
| NUMBER OF CONSECUTIVE PIXELS | Qx | VALUE SET |
|---|---|---|
| 1 | 1 | $T_A$ |
|   | 0 |   |
| 2 | 1 | $T_B$ |
|   | 0 |   |
| 3 | 1 | $T_C$ |
|   | 0 |   |
| 4 | 1 | $T_D$ |
|   | 0 |   |
| 5 | 1 | $T_E$ |
|   | 0 | $T_D$ |
| 6 | 1 | $T_F$ |
|   | 0 | $T_D$ |
| 7 | 1 | $T_G$ |
|   | 0 | $T_D$ |
F I G. 35
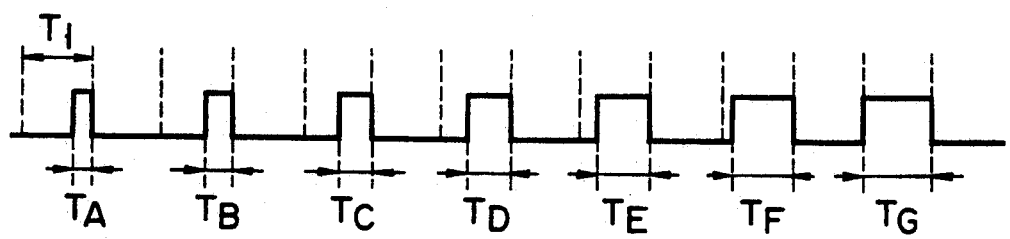
F I G. 36

PRINTER FOR PRINTING AND IMAGE FORMED OF 2-DIMENSIONALLY ARRANGED PIXELS, AND METHOD OF PRINTING THE SAME

BACKGROUND OF THE INVENTION

1. Field of the Invention

The present invention relates to a method of printing an image formed of 2-dimensionally arranged pixels, and also to a printer such as an electronic photography apparatus or a thermal printer, which is designed to print an image formed of 2-dimensionally arranged pixels.

2. Description of the Related Art

A laser printer comprises a photosensitive member and a laser diode. The laser diode is driven in accordance with input image, thus emitting a laser beam to the photosensitive member. The surface of the photosensitive member is thereby scanned with the laser beam.

An item of the image data, which represents a pixel, is a signal S1 having the waveform shown in FIG. 1. As is evident from FIG. 1, the signal S1 is at either a high (H) level or a low (L) level for a period $T_1$ during which the photosensitive member is scanned to form the pixel on its surface. The laser diode is driven by a drive signal S2, which has the same wave form as the image data signal S1 as is illustrated in FIG. 1. Hence, the laser diode emits a laser beam for the period $T_1$, to form a pixel on the photosensitive member.

The electric resistance at the surface of the photosensitive member changes with the amount of light applied to the member. The electric charge of the surface of the member attenuates in accordance with the time the member is exposed to light. Hence, when the laser diode is driven by the signal S2 (FIG. 1) and emits a laser beam to the photosensitive member for the period $T_1$, a circular pixel will be formed on the member, which circumscribes a square one-pixel region as is shown at (a) in FIG. 2.

When driven by two or more consecutive drive signals S2, the laser diode continuously emits a laser beam to the photosensitive member, thereby forming pixels which overlap one another as is shown at (b) in FIG. 2. As can be understood from FIG. 2, these overlapping pixels form a true black image since there are left no blank spaces among them. Therefore, the drive signals S2 are good for printing true black images.

The drive signals S2 shown in FIG. 1 are far form desirable for printing gray scale images by means of a Bayer-type dither. Nor are they desirable for printing characters, particularly complex ones (e.g., Chines characters), each consisting of many strokes. When driven by a signal S2, the laser diode emits a beam for the period $T_1$, whereby a pixel will be formed which circumscribes the one-pixel region. Hence, even if some of consecutive drive signals S2 are at a low level as in the case of printing a gray image or characters, the resultant pixels overlap in most cases, as is illustrated at (c) in FIG. 2.

To print clear-cut gray images or characters, the laser diode can be driven by a signal S3 which is at the high level for a period $T_2$ shorter than the period $T_1$ as is evident from FIG. 1. When driven by the signal S3, the laser diode emits a laser beam to the photosensitive member for the period $T_2$, forming a pixel on the member. This pixel is small, circumscribed by the square defining the one-pixel region as is shown at (a) in FIG. 3. Hence, if some of consecutive drive signals S3 are at a low level, the resultant pixels are discrete, forming a clear-cut gray image or distinct characters as is illustrated at (b) in FIG. 3. Obviously, the drive signals S3 are good for printing gray images and complex characters.

The signals S3, which remain at the high level for the period $T_2$ ($T_2 < T_1$) are not good for printing a true black image, however. When driven by two or more consecutive drive signals S3, the laser diode intermittently emits laser beams, each for the period $T_2$, thereby forming discrete pixels, with blank spaces among them, as is illustrated at (c) in FIG. 3. The discrete pixels, thus formed, fail to define a true black image.

The above-described problem with the conventional laser printer is also inherent in other types of electrophotographic printers, such as a light-emitting diode (LED) printer, a liquid-crystal printer. Further, the problem is found in thermal printers such as a heat-transfer printer, ink-jet printers, and electrostatic printers.

SUMMARY OF THE INVENTION

It is a first object of the invention to provide a printer which can print not only a clear quasi-gray image or clear characters, but also true black images, either on different sheets of printing paper or on the same sheet of printing paper.

It is a second object of the invention to provide a method of printing not only a clear quasi-gray image or clear characters, but also true black images, either on different sheets of printing paper or on the same sheet of printing paper.

To attain the first object, there is provided a printer which comprises:

pixel-forming means for forming a number of pixels on a printing medium, in accordance with image data consisting of pixel-data items representing black pixels and white pixels;

pixel-size setting means for setting a size for a given black pixel to be formed, by determining the values of pixel-data items representing consecutive pixels arranged in a scanning direction and including the given pixel; and control means for controlling the pixel-forming means, causing the pixel-forming means to form, on the printing medium, the given pixel which has the size set by the pixel-size setting means.

Also, to achieve the first object, there is provided a printer which comprises:

pixel-forming means for forming a number of pixels on a printing medium, in accordance with image data consisting of pixel-data items representing black pixels and white pixels;

pixel-size setting means for setting a size for a given black pixel to be formed, by determining the values of pixel-data items representing consecutive pixels arranged in a direction perpendicular to a scanning direction and including the given pixel; and control means for controlling the pixel-forming means, causing the pixel-forming means to form, on the printing medium, the given pixel which has the size set by the pixel-size setting means.

Further, in order to attain the first object, there is provided a printer which comprises:

pixel-forming means for forming a number of pixels on a printing medium, in accordance with image data consisting of pixel-data items representing black pixels and white pixels;

pixel-size setting means for setting a size for a given black pixel to be formed, by determining the values of pixel-data items representing consecutive pixels arranged in a scanning direction and including the given pixel, and the values of pixel-data items representing consecutive pixels arranged in a direction perpendicular to the scanning direction and including the given pixel; and control means for controlling the pixel-forming means, causing the pixel-forming means to form, on the printing medium, the given pixel which has the size set by the pixel-size setting means.

Still further, in order to attain the first object, there is provided a printer which comprises:

pixel-forming means for forming a number of pixels on a printing medium, in accordance with image data consisting of pixel-data items representing black pixels and white pixels;

pixel-size setting means for setting a size for a given black pixel to be formed, by determining the values of pixel-data items representing consecutive pixels arranged in a scanning direction and including the given pixel, the values of pixel-data items representing consecutive pixels arranged in a direction perpendicular to the scanning direction and including the given pixel, and the values of pixel-data items representing consecutive pixels arranged in a direction oblique to the scanning direction and including the given pixel; and control means for controlling the pixel-forming means, causing the pixel-forming means to form, on the printing medium, the given pixel which has the size set by the pixel-size setting means.

To accomplish the second object of the invention, there is provided a method of printing images by means of pixel-forming means, comprising the steps of:

receiving image data consisting of pixel-data items representing black and white pixels arranged;

setting a size for a given black pixel to be formed, by determining the values of pixel-data items representing consecutive pixels arranged in a scanning direction and including the given pixel; and controlling the pixel-forming means, causing the same to form, on the printing medium, the given pixel which has said size.

To accomplish the second object of the invention, too, there is provided a method of printing images by means of pixel-forming means, comprising the steps of:

receiving image data consisting of pixel-data items representing black and white pixels arranged;

setting a size for a given black pixel to be formed, by determining the values of pixel-data items representing consecutive pixels arranged in a direction perpendicular to a scanning direction and including the given pixel; and controlling the pixel-forming means, causing the same to form, on the printing medium, the given pixel which has said size.

Also, in order to achieve the second object of the invention, there is provided a method of printing images by means of pixel-forming means, comprising the steps of:

receiving image data consisting of pixel-data items representing black and white pixels arranged;

setting a size for a given black pixel to be formed, by determining the values of pixel-data items representing consecutive pixels arranged in a scanning direction and including the given pixel, and the values of pixel-data items representing consecutive pixels arranged in a direction perpendicular to the scanning direction and including the given pixel; and controlling the pixel-forming means, causing the same to form, on the printing medium, the given pixel which has said size.

Moreover, to attain the second object of the invention, there is provided a method of printing images by means of pixel-forming means, comprising the steps of:

receiving image data consisting of pixel-data items representing black and white pixels arranged;

setting a size for a given black pixel to be formed, by determining the values of pixel-data items representing consecutive pixels arranged in a scanning direction and including the given pixel, the values of pixel-data items representing consecutive pixels arranged in a direction perpendicular to the scanning direction and including the given pixel, and the values of pixel-data items representing consecutive pixels arranged in a direction oblique to the scanning direction and including the given pixels; and controlling the pixel-forming means, causing the same to form, on the printing medium, the given pixel which has said size.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 shows 3-pixel patterns which can be detected by the emission-time setting section incorporated in the laser printer of FIG. 4;

FIG. 10 is a block diagram showing another laser printer which is a third embodiment of the present invention;

FIG. 14 shows various pixel patterns which the printer of FIG. 10 forms;

FIG. 15 represents a pixel pattern formed by the printer of FIG. 10 and defining a true black image;

FIG. 16 is a block diagram showing another thermal printer which is a fourth embodiment of the present invention;

FIG. 17 is a timing chart showing latch signals and enable signals, which are used in the thermal printer illustrated in FIG. 16;

FIG. 19 schematically shows the data table used in the emission-time setting section of the printer shown in FIG. 18;

FIG. 20 represents a variety of pixel-patterns which the emission-time setting section of the printer shown in FIG. 18 can detect;

FIG. 21 is a timing chart showing the pixel signals, emission-time setting signals, and laser-driving signals—all used in the printer of FIG. 18;

FIG. 22 is a diagram showing various pixel patterns which the printer of FIG. 18 can form;

FIG. 23 represents a pixel pattern formed by the printer of FIG. 18 and defining a true black image;

FIG. 24 is a block diagram illustrating still another thermal printer which is a sixth embodiment of the present invention;

FIG. 25 is a timing chart showing latch signals and enable signals, which are used in the thermal printer illustrated in FIG. 24;

FIG. 27 is a schematic representation of the data table used in the emission-time section of the laser beam printer shown in FIG. 26;

FIG. 28 is a timing chart showing the pixel signals, emission-time setting signals, and laser-driving signals—all used in the printer of FIG. 26 to print images;

FIG. 29 illustrates pixels of various sizes which the printer of FIG. 26 can form on a printing medium;

FIG. 30 represents a pixel pattern formed by the printer of FIG. 26 and defining a true black image;

FIG. 32 is a timing chart showing latch signals and enable signals, which are used in the thermal printer illustrated in FIG. 31;

FIG. 34 schematically shows a pixel pattern which the printer of FIG. 33 can detects;

FIG. 35 is a schematic representation of the data table used in the emission-time setting section of the laser printer illustrated in FIG. 33; and FIG. 36 shows laser-driving signals having different durations, which are used in the printer of FIG. 34 to print images.

DETAILED DESCRIPTION OF THE PREFERRED EMBODIMENTS

Embodiments of the present invention will now be described, with reference to the accompanying drawings.

First Embodiment

Figure 4:
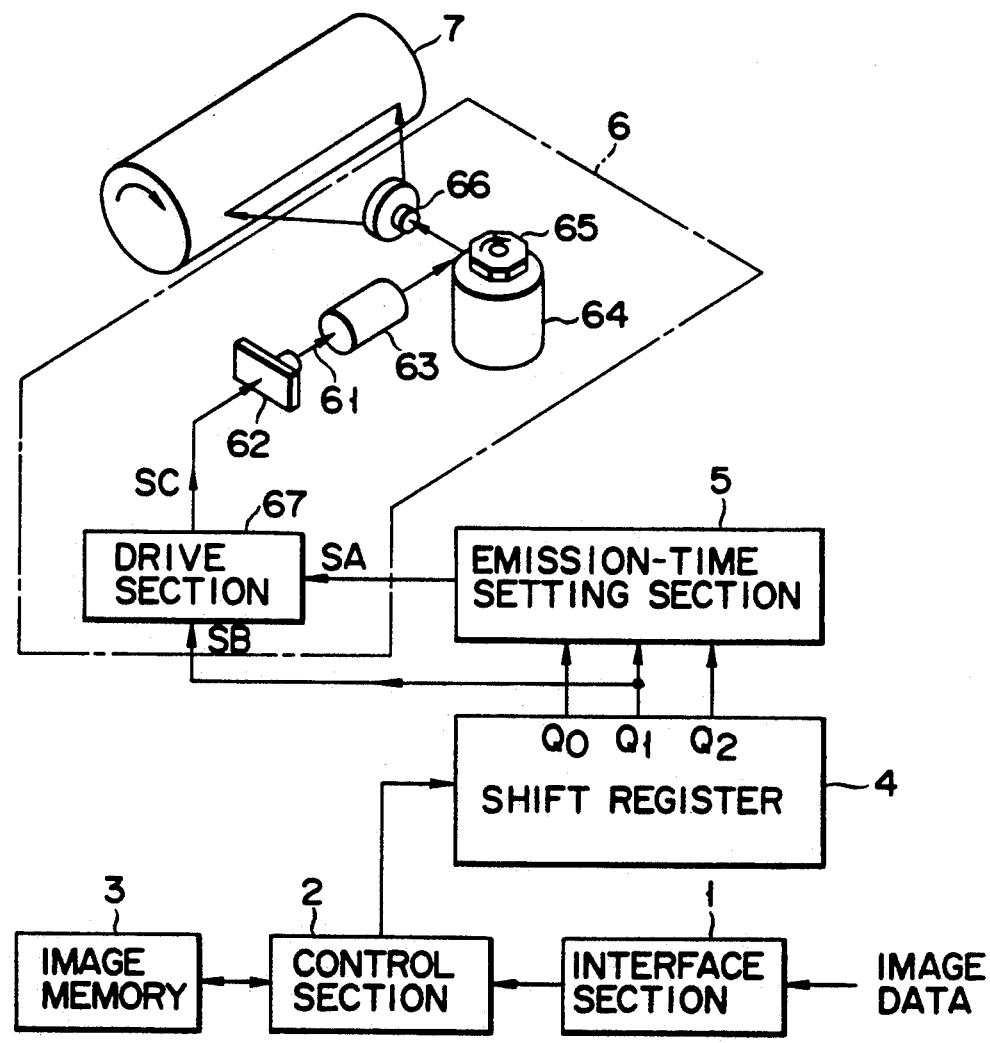
FIG. 4 is a block diagram illustrating a laser printer which is a first embodiment of the present invention.

FIG. 4 illustrates a laser printer according to the first embodiment of the invention. As is shown in FIG. 4, the laser printer comprises an interface section 1, a control section 2, an image memory 3, a shift register 4, an emission-time setting section 5, and a laser scanner unit (LSU) 6, and a photosensitive drum 7.

The interface section 1 transfers image data between the control section 2 and an external device (not shown). (When the laser printer is incorporated in a facsimile apparatus, the section 1 transfers the image data between the section 2 and the data receiving/transmitting section of the facsimile apparatus.)

The control section 2 supplies the image data to the image memory 3. The memory 3 has storage capacity great enough to store at least one page of data. Every time the memory 3 stores one page of data, the one-page data is read from the memory 3 and supplied to the shift register 4 under the control of the control section 2.

The shift register 4 is a 3-bit one, which shifts the input data, bit by bit, in response to the pulses forming the image data, which are used as transfer clock pulses. The shift register 4 outputs three bits $Q_0$, $Q_1$ and $Q_2$ simultaneously to the emission-time setting section 5. In other words, the register samples every three bits of the image data, which represents three consecutive pixels to be formed on the photosensitive drum 7 and be aligned in the horizontal direction, i.e., the direction of the main scanning of the drum 7.

The bit $Q_1$ is supplied to the LSU 6 as pixel signal representing the pixel corresponding to the bit $Q_1$.

The emission-time setting section 5 has a ROM (not shown) storing data items showing reference 3-bit patterns. The section 5 detects a 3-pixel patterns from the values of the three bits $Q_0$, $Q_1$ and $Q_2$ supplied from the shift register 4, and outputs an emission-time signal SA to the LSU 6. The signal SA represents the time for which the LSU 6 is driven to print the pixel corresponding to the bit $Q_1$.

As is evident from FIG. 4, the LSU 6 comprises a laser diode 62, a collimator lens 63, an electric motor 64, a polygon mirror 65, an f-θ lens 66, a drive section 67. Upon receipt of the pixel signal SB from the shift register 4, the drive section 67 outputs a drive signal SC which is a pulse having the width corresponding the emission time represented by the signal SA output by the time-emission setting section 5. The drive signal SC is supplied to the laser diode 62. Driven by the signal SC, the diode 62 emits a laser beam 61 for the time set by the section 5. The beam 61 is applied to the collimator lens 63, which converges the beam 61 into a laser beam having a predetermined diameter. The beam from the collimator 63 is applied to the polygon mirror 65 being rotated by the motor 64 at a constant speed. The mirror 65 reflects the beam and applies it to the f-θ lens 66. The lens 66 applies the beam to the photosensitive drum 7, achieving a uniform-speed scanning of the drum 7 and forming a latent pixel image on the drum 7.

Various devices (not shown), such as a drum-charging device, an image-developing device, an image-transferring device, an image-fixing device, a drum-cleaning device—all being of the known types—are located around the photosensitive drum 7. Equipped with these devices, the laser printer shown in FIG. 4 is an electrophotographic printer of so-called "reverse developing type."

The operation of the laser printer will now be explained, with reference to FIGS. 5, 6 and 7.

First, the image data stored in the image memory 3 is input to the shift register 4, bit by bit, under the control of the control section 2. Every time the image data is shifted by one bit in the register 4, three consecutive bits $Q_0$, $Q_1$ and $Q_2$ are supplied to the emission-time setting section 5, and the bit $Q_1$ is supplied as a pixel signal SB to the drive section 67.

Whenever the bit $Q_1$ is "1," thus representing a black pixel, the emission-time setting section 5 detects the 3-pixel pattern defined by the bits $Q_0$, $Q_1$ and $Q_2$, from the values of these bits $Q_0$, $Q_1$ and $Q_2$ which represents three consecutive pixels arranged in the horizontal direction (i.e., the main scanning direction). When the bit $Q_1$ is "1," the three bits $Q_0$, $Q_1$ and $Q_2$ can define the following four 3-pixel patterns:

| | |
|---|---|
| Pattern 1: | Only the middle pixel is black, as is shown at (a) in FIG. 5. |
| Pattern 2: | The middle and left pixels are black, as is shown at (b) in FIG. 5. |
| Pattern 3: | The middle and right pixels are black, as is shown at (c) in FIG. 5. |
| Pattern 4: | All three pixels are black, as is shown at (d) in FIG. 5. |

When the section 5 detects the 3-pixel pattern 1, it outputs a signal SA representing a beam-emission period $T_A$. When it detects the 3-pixel pattern 2 or 3, it generates a signal SA representing a beam-emission period $T_B$. When it detects the 3-pixel pattern 4, it outputs a signal SA representing a beam-emission period $T_C$.

Figure 6:
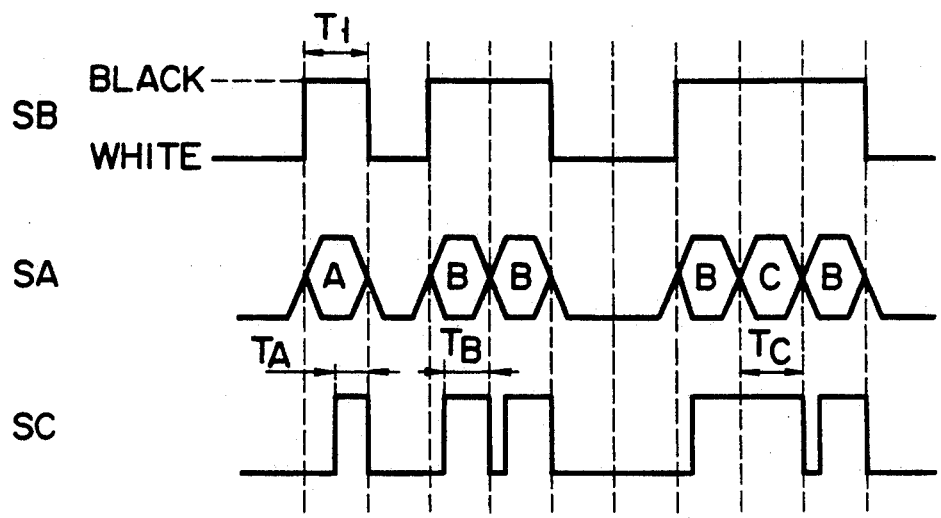
FIG. 6 is a timing chart showing the pixel signals, emission-time setting signals, and laser-driving signals—all used in the printer shown in FIG. 4.
Figure 7:
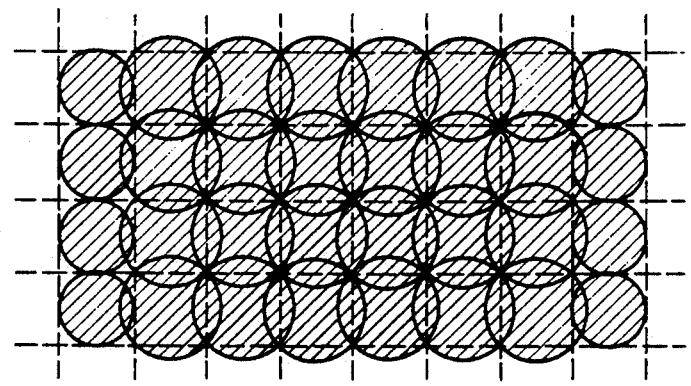
FIG. 7 represents the pixel pattern formed by the printer of FIG. 4 and defining a true black image.

As is shown in FIG. 6, the drive section 67 outputs, in response to the signal SA representing the period $T_A$, a drive signal SC which is at a high level for the period $T_A$; it outputs, in response to the signal SA representing the period $T_B$, a drive signal SC which is at a high level for the period $T_B$; it outputs, in response to the signal SA showing the period $T_C$, a drive signal SC which is at a high level for the period $T_C$. Here, $T_A < T_B < T_C \leq T_1$. The period $T_C$ is equal to a one-pixel scanning period $T_1$ in the present embodiments.

Figure 1:
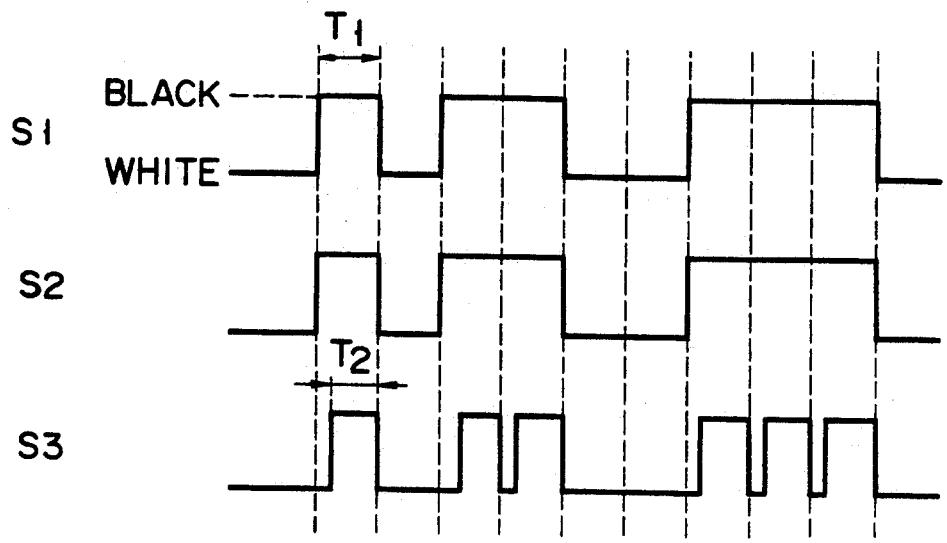
FIG. 1 is a timing chart showing the image-data signals, laser-driving signals of one type, and laser-driving signals of another type—all used in a conventional laser printer.
Figure 2:
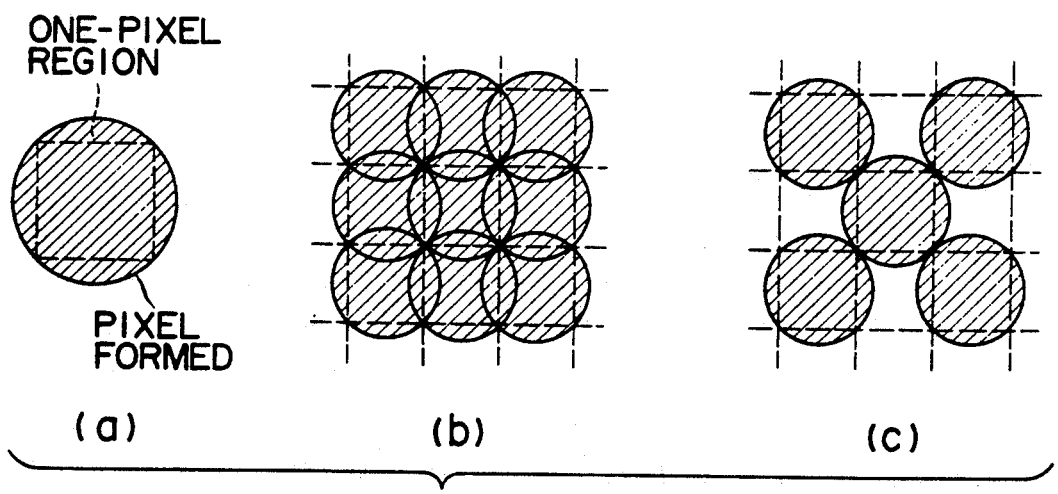
FIG. 2 shows various pixel-patterns which the conventional laser printer forms when laser-driving signals of the first type are used.
Figure 3:
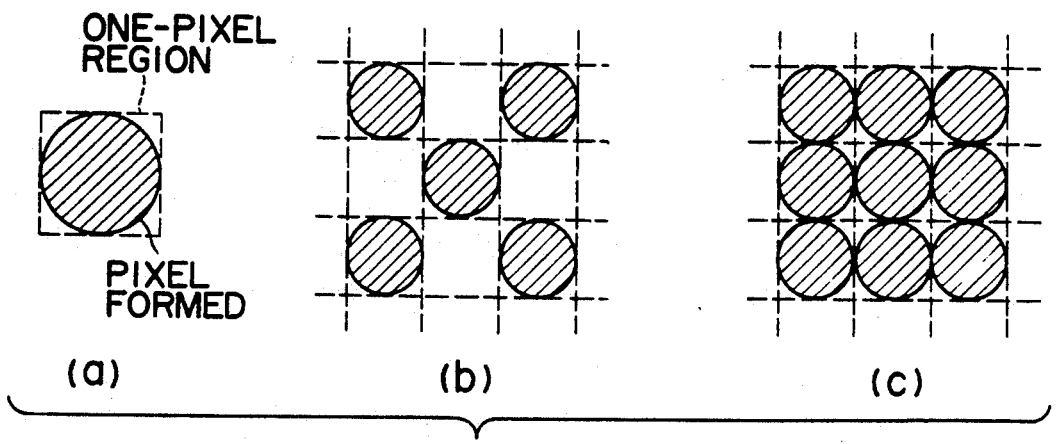
FIG. 3 shows various pixel patterns which the conventional laser printer forms when laser-driving signals of the second type are used.

When driven for the shortest period $T_A$, the laser diode 62 emits a laser beam for this period $T_A$, whereby a pixel is formed on the drum 7, which is small and located well within the one-pixel region. When driven for the longer period $T_B$, the laser diode 62 emits a laser beam for the period $T_B$, whereby a pixel is formed on the drum 7, which is circumscribed by the one-pixel region, as is shown in at (a) in FIG. 3. When driven for the longest period $T_C$, the laser diode 62 emits a laser beam for this period $T_C$, whereby a pixel is formed on the drum 7, which is large, circumscribing the one-pixel region, as is shown at (a) in FIG. 2.

To print a quasi-gray image or complex characters, which are defined by discrete black pixels, the laser diode 62 is repeatedly driven, each time for the period $T_A$ or $T_B$ and emitting a laser beam for this period, whereby discrete black pixels, each located well within or circumscribed by the one-pixel region, are formed ultimately on a printing medium. The black pixels, thus formed define a clear-cut quasi-gray image or distinct characters.

On the other hand, to print a true black image, which is defined by overlapping black pixels, the laser diode 62 is repeatedly driven, each time for the period $T_C$ (i.e., one-pixel scanning period $T_1$) and emitting for the period $T_C$, whereby black pixels, each circumscribing the one-pixel region and overlapping another, are formed ultimately on a printing medium. The black pixels, thus formed, define a true black image.

A pattern of three consecutive pixels is recognized in the present embodiment. Then when either one of right and left side pixels in the pattern having more than three consecutive pixels is detected, the condition of the end pixels is discriminated as two consecutive black pixels. As a result, a black pixel of which size is smaller than that obtained in three consecutive pixels is formed, thereby obtaining a true black image of FIG. 7 as apparent from FIG. 7, the size of the black pixels at right and left side is smaller than that of the other black pixels. In such an image, the boundary between the true black image and white portion surrounding the two black image can be clearly recognized when it is observed by eyes. The printed condition can, therefore, be improved.

Second Embodiment

Figure 8:
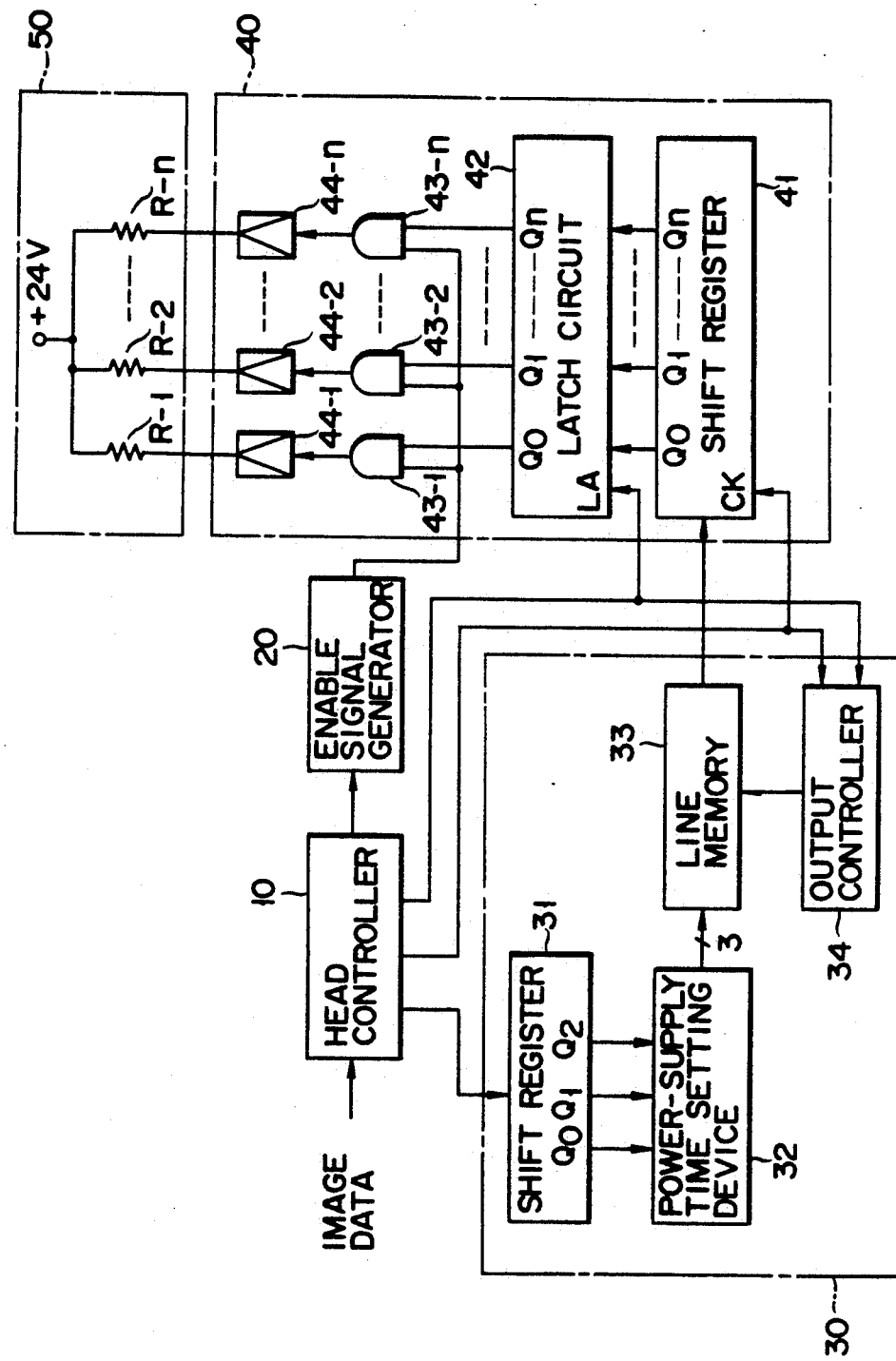
FIG. 8 is a block diagram illustrating a thermal printer which is a second embodiment of the present invention.

FIG. 8 illustrates a thermal printer which is a second embodiment of the present invention. As FIG. 8 shows, the thermal printer comprises a head controller 10, an enable signal generator 20, an image data processing section 30, a head driver 40, and a thermal print head 50.

The head controller 10 is connected to an external device (not shown). (When the thermal printer is incorporated in a facsimile apparatus, the head controller 10 is connected to the image data between the section 2 and the data receiving/transmitting section of the facsimile apparatus.) The head controller 10 receives image data from the external device and supplies the data to the image data processing section 30. It generates timing signals, latch signals, and clock signals—all synchronous with the pixel signals forming the image data. The timing signals are supplied to the enable signal generator 20. The latch signals and the clock signals are supplied to the image data processing section 30.

The enable signal generator 20 generates enable signals from the timing signals produced by the head controller 10, and supplies the enable signals (later described) to the head driver 40.

The image processing section 30 comprises a shift register 31, a power-supply time setting device 32, a line memory 33, and an output controller 34. The shift register 31 is a 3-bit register, and shifts the input data, bit by bit, in response to the pulses forming the image data, which are used as transfer clock pulses. The shift register 4 outputs three bits $Q_0$, $Q_1$ and $Q_2$ simultaneously to the power-supply time setting device 32. In other words, the shift register 31 samples every three bits of the image data, which represents three consecutive pixels to be formed on a printing medium and be aligned in the horizontal direction. The power-supply time setting device 32 has a ROM, and outputs a 3-bit data item consisting of the bits $Q_0$, $Q_1$ and $Q_2$ simultaneously output from the shift register 31. The 3-bit data item is stored into the line memory 33. The line memory 33 has capacity of storing n 3-bit data items, where n is the number of pixels forming one horizontal line. The output controller 34 controls the line memory 33 in accordance with the clock signal and the latch signal supplied from the head controller 10, causing the line memory 33 to output pixel bits, one by one.

The head driver 40 comprises a shift register 41, a latch circuit 42, two-input AND gates 43-1, 43-2, ..., 43-n, and switching amplifiers 44-1, 44-2, ..., 44-n. The register 41 is an n-bit shift register. It holds and shifts the pixel bits output by the line memory 33, and supplies n pixel bits $Q_0$ to $Q_n$ simultaneously to the latch circuit 42 in response to a clock signal CK supplied from the head controller 10. The latch circuit 42 receives and holds the n pixel bits $Q_0$ to $Q_n$ supplied from the shift register 41, in response to a latch signal LA supplied from the head controller 10. The pixel bits $Q_0$ to $Q_n$ are output from the latch circuit 42 and supplied to the AND gates 43-1 to 43-n, respectively, at their first input terminals. The other input terminal of each AND gate is coupled to the enable signal generator 20, thus receiving the enable signal EN therefrom. The outputs of the AND gates 43-1 to 43-n are connected to the switching amplifiers 44-1 to 44-n, respectively. Hence, the AND gates 43-1 to 43-n supply the pixel bits $Q_0$ to $Q_n$ to the switching amplifiers 44-1 to 44-n, respectively, only while the enable signal EN remains at a high level. The outputs of the switching amplifiers 44-1 to 44-n are connected to the heating resistors R-1 to R-n incorporated in the thermal print head 50. Each switching amplifier applies a voltage of 24V to the heating resistor as long as the input signal remains at the high level.

The operation of the thermal printer shown in FIG. 8 will now be explained, with reference to the timing chart of FIG. 9.

First, image data is supplied from the external device to the head controller 10. The head controller 10 supplies the image data to the image data processing section 30, and generates a timing signal, a clock signal CK, and a latch signal LA. The timing signal is input to the enable signal generator 20, the clock signal CK is supplied to the output controller 34 and the shift register 41, and the latch circuit LA is supplied to the output controller 34 and the latch circuit 42.

Upon receipt of the timing signal, the enable signal generator 20 generates an enable signal EN. The enable signal EN is supplied to the second input terminals of the AND gates 43-1 to 43-n.

In the image processing section 30, the shift register 31 outputs three bits $Q_0$, $Q_1$ and $Q_2$ for each pixel bit, simultaneously, to the power-supply time setting device 32. These bits $Q_0$, $Q_1$ and $Q_2$ represent three consecutive pixels to be formed on a printing medium and be aligned in the horizontal direction. The power-supply time setting device 32 outputs a 3-bit data item which represents the combination of the bits $Q_0$, $Q_1$ and $Q_2$, in terms of the values thereof. More specifically, the device 32 produces 3-bit data items in the following scheme:

1. When the bits $Q_0$, $Q_1$ and $Q_2$ are "0", "1" and "0", respectively, the device 32 produces a 3-bit data of "001."

2. When the bits $Q_0$, $Q_1$ and $Q_2$ are "1", "1" and "0", respectively, the device 32 produces a 3-bit data of "010."

3. When the bits $Q_0$, $Q_1$ and $Q_2$ are "0", "1" and "1", respectively, the device 32 produces a 3-bit data of "010."

4. When the bits $Q_0$, $Q_1$ and $Q_2$ are "1", "1" and "1", respectively, the device 32 produces a 3-bit data of "100."

5. When the bit $Q_1$ is "0", the device 32 produces a 3-bit data of "000."

The 3-bit data item is stored into the line memory 33. As the shift register 31 sequentially inputs other 3-bit pixel data items, each consisting of the bits $Q_0$, $Q_1$ and $Q_2$, to the power-supply time setting device 32, the device 32 outputs other 3-bit data items, each for one pixel bit. These 3-bit data items are stored into the line memory 33, one after another.

In accordance with the clock signal CK, the output controller 34 control the line memory 33, whereby only the first bit (i.e., the least significant bit) of each 3-bit data item is read from the memory 33. The first bit of each 3-bit data item is supplied to the head driver 40.

Figures 9, 11:
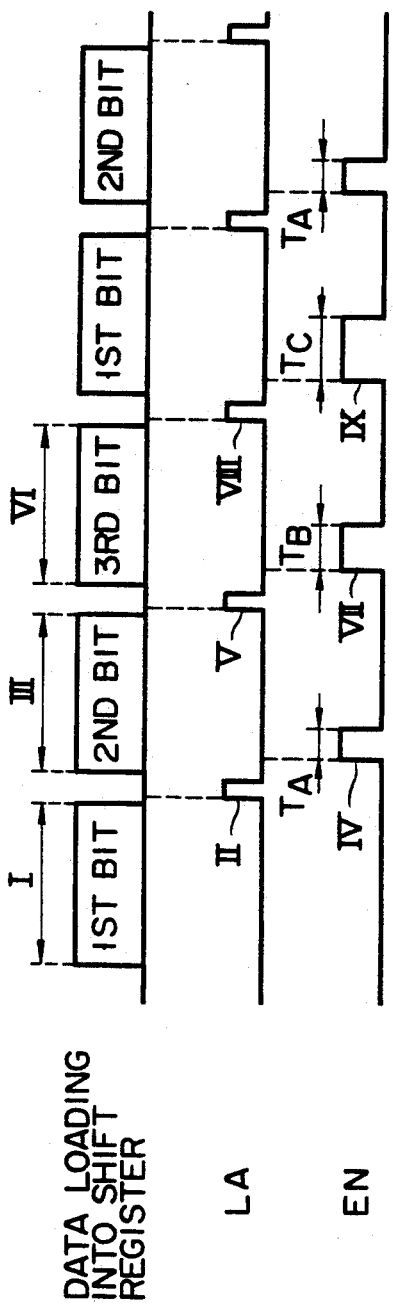
FIG. 9 is a timing chart showing latch signals and enable signals, which are used in the thermal printer shown in FIG. 8.
FIG. 11 schematically represents the data table used in the emission-time setting section of the printer shown in FIG. 10.

In the head driver 40, n bits read from the line memory 33, each being the first bit of each 3-bit data item, are stored into the shift register 41, one after another, during the period I as is shown in FIG. 9. When the last of these n bits is stored into the register 41, the head controller 10 outputs a latch signal pulse II having a predetermined width, as can be understood from FIG. 9. This pulse II is supplied to the latch circuit 42 and also to the output controller 34. In response to the pulse II, the latch circuit 42 receives and holds the n bits from the shift register 41.

In response to the latch signal pulse II, the output controller 34 controls the line memory 33, whereby only the second bit (i.e., the second least significant bit) of each 3-bit data item is read from the memory 33. As a result, n bits, each being the second bit of each 3-bit data item stored in the memory 33, are input to the shift register 41, one after another, during the period III as is shown in FIG. 9.

The enable signal generator 20 generates an enable signal pulse in response to the timing signal supplied from the head controller 10, upon lapse of a predetermined time from the trailing edge of each latch signal pulse, as can be understood from FIG. 9. Hence, the generator 20 generates an enable signal pulse IV having a width $T_A$ upon lapse of said time from the trailing edge of the latch signal pulse II. This pulse IV is supplied to the second input terminal of each AN gate.

In the meantime, the n bits $Q_0$ to $Q_n$ held in the latch circuit 42, each being the first bit of each 3-bit data item stored in the line memory 33, are input to the AND gates 43-1 to 43-n, respectively. Hence, any AND gate, whose first input terminal receives a "1" bit which indicates that only the middle of the three consecutive pixels is black, is on for the period $T_A$, i.e., the width of the enable signal pulse IV. As a result, the switching amplifier coupled to such AND gate is turned on for the same period $T_A$, applying the voltage (24V) to the corresponding heating resistor of the thermal print head 50.

When the last of the n bits, each being the second bit of each 3-bit data item stored in the line memory 33, is input to the shift register 41, the head controller 10 outputs a latch signal pulse V as is shown in FIG. 9. The pulse V is supplied to the output controller 34 and the latch circuit 41. In response to this pulse V, the latch circuit 42 receives and holds the n bits from the shift register 41.

In response to the latch signal pulse V, the output controller 34 controls the line memory 33, whereby only the third bit (i.e., the most significant bit) of each 3-bit data item is read from the memory 33. As a result, n bits, each being the third bit of each 3-bit data item stored in the memory 33, are input to the shift register 41, one after another, during the period VI as is shown in FIG. 9.

Upon lapse of the predetermined time from the trailing edge of the latch signal pulse V, the generator 20 generates an enable signal pulse VII having a width $T_B$. This pulse VII is supplied to the second input terminal of each AND gate.

Meanwhile, the n bits $Q_0$ to $Q_n$ held in the latch circuit 42, each being the second bit of each 3-bit data item stored in the line memory 33, are input to the AND gates 43-1 to 43-n, respectively. Hence, any AND gate, whose first input terminal receives a "1" bit which indicates that the middle and left or right of the three consecutive pixels are black, is on for the period $T_B$, i.e., the width of the enable signal pulse VII. The switching amplifier coupled to such AND gate is thereby turned on for the same period $T_B$, applying the voltage (24V) to the corresponding heating resistor of the thermal print head 50.

When the last of the n bits, each being the third bit of each 3-bit data item stored in the line memory 33, is input to the shift register 41, the head controller 10 outputs a latch signal pulse VIII as is shown in FIG. 9. The pulse VIII is supplied to the output controller 34 and the latch circuit 41. In response to this pulse VIII, the latch circuit 42 receives and holds the n bits from the shift register 41.

In response to the latch signal pulse VIII, the output controller 34 controls the line memory 33, whereby only the first bit (i.e., the least significant bit) of each 3-bit data item of the next one-line data is read from the memory 33. As a result, n bits, each being the first bit of each 3-bit data item stored in the memory 33, are input to the shift register 41, one after another.

Upon lapse of the predetermined time from the trailing edge of the latch signal pulse VIII the generator 20 generates an enable signal pulse XI having a width $T_C$. This pulse XI is supplied to the second input terminal of each AND gate.

In the meantime, the n bits $Q_0$ to $Q_n$ held in the latch circuit 42, each being the third bit of each 3-bit data item stored in the line memory 33, are input to the AND gates 43-1 to 43-n, respectively. Hence, any AND gate, whose first input terminal receives a "1" bit which indicates that the three consecutive pixels are black, is on for the period $T_C$, i.e., the width of the enable signal pulse XI. The switching amplifier coupled to such AND gate is thereby turned on for the same period $T_C$ applying the voltage (24V) to the corresponding heating resistor of the thermal print head 50.

The enable signal generator 20 cyclically generates three pulses having widths $T_A$, $T_B$ and $T_C$, where $T_A < T_B < T_C$. The widths $T_A$, $T_B$ and $T_C$ defines periods $T_A$, $T_B$ and $T_C$, during which the heating the switching amplifiers 44-1 to 44-n apply the drive voltage to the heating resistors R-1 to R-n of the thermal print head 50.

The image data processing section 30 processes other one-line data items sequentially supplied from the head controller 10, in the specific way explained above. The head driver 40 drives the thermal print head 50 in the manner described above, in accordance with the signals CK and LA supplied from the head controller 10 and also in accordance with the enable signals EN generated by the enable signal generator 20.

As has been described, the 3-bit data output by the power-supply time setting section 32 is "001" when only the middle one of three consecutive pixels is black, is "010" when the middle one and left or right one of three consecutive pixels are black, is "100" when all consecutive three pixels are black, and is "000" when the middle one of the three consecutive pixels is white. In other words, only the first bit of the 3-bit data output by the device 32 is "1" when the middle pixel is black, only the second bit thereof is "1" when the middle pixel and the left or right pixel are black, only the third bit thereof is "1" when all three pixels are black, and none of the three bits are "1" when the middle pixel is white.

Thus, when only the middle pixel is black, the heating resistor is driven for the period $T_A$, printing a small black pixel located well within the one-pixel region. When the middle pixel and the left for right pixel are black, the heating resistor is driven for the period $T_B$ longer than the period $T_A$, thereby printing a black pixel circumscribed by the one-pixel region, as is shown at (a) in FIG. 3. When all three pixels are black, the heating resistor is driven for the period $T_C$ longer than the period $T_B$, thus printing a black pixel circumscribing the one-pixel region, as is illustrated at (a) in FIG. 2. When the middle pixel is white, no voltage is applied to the heating resistor since none of the three bits are "1," and the resistor prints no black pixel.

When the heating resistors R-1 to R-n are repeatedly driven, each time for the period $T_A$ or $T_B$, discrete black pixels, each located well within or circumscribed by the one-pixel region, will be formed on a printing medium, defining a clear-cut quasi-gray image or distinct characters.

On the other hand, when the heating resistors R-1 to R-n are repeatedly driven, each time for the period $T_C$, overlapping black pixels, each circumscribing the one-pixel region, will be formed on a printing medium, defining a true black image.

Third Embodiment

FIG. 10 illustrates a laser printer which is a third embodiment of the present invention and which is similar to the laser printer shown in FIG. 4. Some of the components of this printer, which are identical to those shown in FIG. 4 are designated at the same numerals in FIG. 10 and will not be described in detail.

As is evident from FIG. 10, the laser printer comprises an interface section 1, a control section 2, an image memory 3, a laser scanner unit (LSU) 6, a photosensitive drum 7, three shift registers 104a, 10b and 104c, and an emission-time setting section 105.

The shift registers 104a, 104b and 104c are each an n-bit shift register, where n is the number of pixels which form a one-line image. They shift the input data, bit by bit, in response to the transfer clock pulses, i.e., the pulses forming the image data supplied to the interface section 1. These registers 104a, 104b and 104c are connected in series. Hence, the output of the register 104a is input to the register 104b, and the output of the register 104b is input to the register 104c. Every time the one-line image data items are shifted by one bit in the registers 104a, 104b and 104c, these registers output three bits $Q_A$, $Q_B$ and $Q_C$, respectively. These three bits represent three consecutive pixels to be printed in the vertical direction, i.e., the sub-scanning direction. In other words, the shift registers 104a, 104b and 104c cooperate to sample every three bits of the image data, which represent three consecutive pixels to be formed on the photosensitive drum 7 and be aligned in the vertical direction, or the direction of the sub-scanning of the drum 7.

The three bits $Q_A$, $Q_B$ and $Q_C$ output from the registers 104a, 104b and 104c, respectively, are supplied to the emission-time setting section 105. Of these three bits, the bit $Q_B$, i.e., the output of the register 104b, is supplied to the drive section 67 of the LSU 6 since the output of the register 104b is connected to the drive section 67.

The emission-time setting section 105 has a ROM (not shown) storing the data table shown in FIG. 11. The section 5 detects one of the four-3-pixel patterns shown in FIG. 12, from the values of the three bits $Q_A$, $Q_B$ and $Q_C$ supplied from the shift registers 104a, 104b and 104c, and outputs an emission-time signal SA to the LSU 6. The signal SA represents the time for which the LSU 6 is driven to print the pixel corresponding to the bit $Q_B$.

As in the laser beam shown in FIG. 4, various devices (not shown), such as a drum-charging device, an image-developing device, an image-transferring device, an image-fixing device, a drum-cleaning device—all being of the known types—are located around the photosensitive drum 7.

The operation of the laser printer shown in FIG. 10 will now be explained, with reference to FIG. 11 through FIG. 15.

At first, the shift registers 104a, 104b and 104c are empty. Then, the image data is supplied to the shift register 104a, hence to the shift register 104b, and further to the shift register 104c. Thus, the image data is shifted, bit by bit, through the registers 104a, 104b and 104c under the control of the control section 2. As has been described, the shift registers 104a, 104b and 104c are each an n-bit register, capable of storing a one-line data, and are connected in series. Hence, when the shift register 104a starts receiving the third one-line data, the shift register 104b starts outputting the first one-line data to the drive section 67, bit by bit, each being being a pixel SB.

The drive section 67 drives the laser diode 62 incorporated in the LSU 6 in accordance with the data output from the shift register 104b. Meanwhile, the emission-time setting section 105 receives the three bits $Q_A$, $Q_B$ and $Q_C$ from the registers 104a, 104b and 104c, detects the 3-pixel pattern from these bits $Q_A$, $Q_B$ and $Q_C$, and and output an emission-time signal SA which corresponds to one of the data items stored in the ROM. The signal SA is supplied to the drive section 67.

Figure 12:
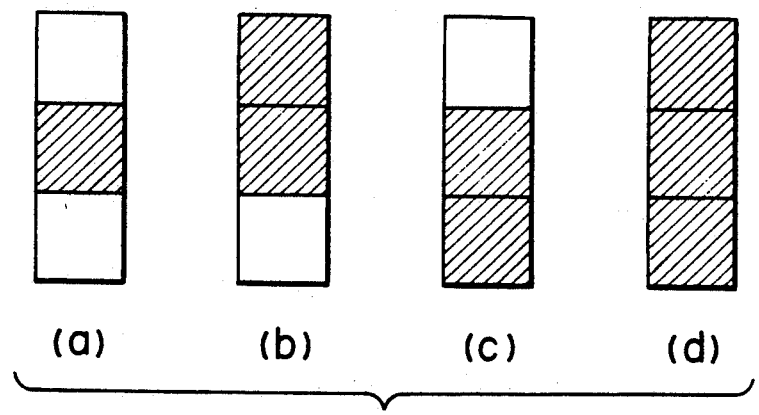
FIG. 12 shows 3-pixel patterns which can be detected by the emission-time setting section of the laser printer illustrated in FIG. 10.

More specifically, the emission-time setting section 105 detects the 3-pixel pattern defined by the bits $Q_A$, $Q_B$ and $Q_C$, from the values of these bits which represents three consecutive pixels arranged in the vertical direction (i.e., the sub-scanning direction). When the bit $Q_B$ is "1," the three bits $Q_A$, $Q_B$ and $Q_C$ can define the following four 3-pixel patterns:

| | |
|---|---|
| Pattern 1: | Only the middle pixel is black, as is shown at (a) in FIG. 12. |
| Pattern 2: | The middle and upper pixels are black, as is shown at (b) in FIG. 12. |
| Pattern 3: | The middle and lower pixels are black, as is shown at (c) in FIG. 12. |
| Pattern 4: | All three pixels are black, as is shown at (d) in FIG. 12. |

When the section 105 detects the 3-pixel pattern 1, it data item A (FIG. 11) and outputs a signal SA representing a beam-emission period $T_A$. When it detects the 3-pixel, pattern 2 or 3, it selects data item B and generates a signal SA representing a beam-emission period $T_B$. When it detects the 3-pixel pattern 4, it selects data item C and outputs a signal SA representing a beam-emission period $T_C$.

Figure 13:
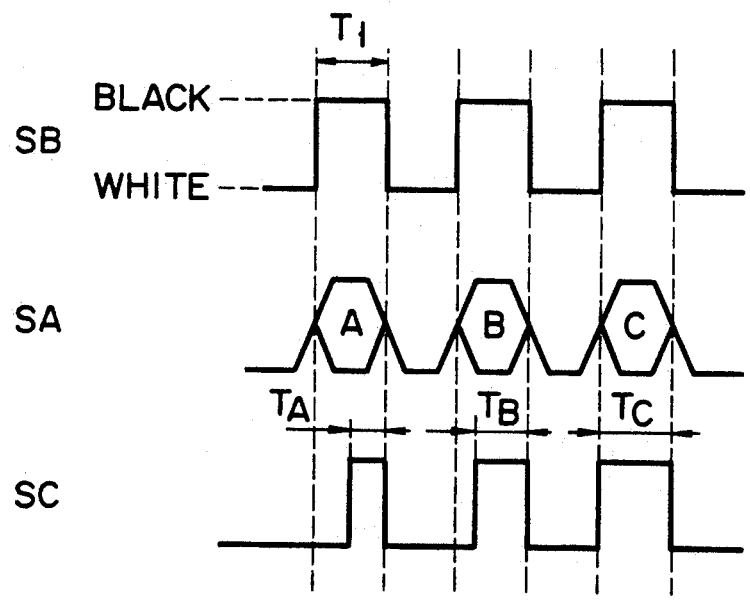
FIG. 13 is a timing chart showing the pixel signals, emission-time setting signals, and laser-driving signals—all used in the printer shown in FIG. 10.

As is shown in FIG. 13, the drive section 67 outputs, in response to the signal SA representing the period $T_A$, a drive signal SC which is at a high level for the period $T_A$; it outputs, in response to the signal SA representing the period $T_B$, a drive signal SC which is at a high level for the period $T_B$; it outputs, in response to the signal SA showing the period $T_C$, a drive signal SC which is at a high level for the period $T_C$. Here, $T_A < T_B < T_C \leq T_1$. The period $T_C$ is equal to a one-pixel scanning period $T_1$ in the present embodiments.

When driven for the shortest period $T_A$, the laser diode 62 emits a laser beam for this period $T_A$, whereby a pixel is formed on the drum 7, which is small and located well within the one-pixel region as is shown at (a) in FIG. 14. When driven for the longer period $T_B$, the laser diode 62 emits a laser beam for the period $T_B$, whereby a pixel is formed on the drum 7, which is circumscribed by the one-pixel region, as is shown in at (b) in FIG. 14. When driven for the longest period $T_C$, the laser diode 62 emits a laser beam for this period $T_C$, whereby a pixel is formed on the drum 7, which is large, circumscribing the one-pixel region, as is shown at (c) in FIG. 14.

To print a quasi-gray image or complex characters, which are defined by discrete black pixels, the laser diode 62 is repeatedly driven, each time for the period $T_A$ or $T_B$ and emitting a laser beam for this period, whereby discrete black pixels, each located well within or circumscribed by the one-pixel region, are formed ultimately on a printing medium. The black pixels, thus formed, define a clear-cut quasi-gray image or distinct characters.

On the other hand, to print a true black image, which is defined by overlapping black pixels, the laser diode 62 is repeatedly driven, each time for the period $T_C$ (i.e., one-pixel scanning period $T_1$) and emitting for the period $T_C$, whereby black pixels, each circumscribing the one-pixel region and overlapping another, are formed ultimately on a printing medium. The black pixels, thus formed, define a true black image.

A pattern of three consecutive pixels is recognized in the present embodiment. Then when either one of upper and lower side pixels in the pattern having more than three consecutive pixels is detected, the condition of the end pixels is discriminated as two consecutive black pixels. As a result, a black pixel of which size is smaller than that obtained in three consecutive pixels is formed, thereby obtaining a true black image of FIG. 15 as apparent from FIG. 15, the size of the black pixels at upper and lower side is smaller than that of the other black pixels. In such as image, the boundary between the true black image and white portion surrounding the two black image can be clearly recognized when it is observed by eyes. The printed condition can, therefore, be improved.

Fourth Embodiment

FIG. 16 illustrates a thermal printer which is a fourth embodiment of the present invention. As FIG. 16 shows, the thermal printer comprises a head controller 10, an enable signal generator 20, a head driver 40, a thermal print head 50, and an image data processing section 130. All the components, except for the section 130, are identical in both structure and function to those designated at the same reference numerals in FIG. 8.

The image processing section 130 comprises three shift registers 131a, 131b, 131c, a power-supply time setting device 132, a line memory 133, and an output controller 134.

The shift registers 131a, 131b and 131c are each an n-bit shift register, where n is the number of pixels which form a one-line image. They shift the input data, bit by bit, in response to the transfer clock pulses, i.e., the pulses forming the image data supplied from the head controller 10. These registers 131a, 131b and 131c are connected in series. Hence, the output of the register 131a is input to the register 131b, and the output of the register 131b is input to the register 131c. Every time the one-line image data items are shifted by one bit in the registers 131a, 131b and 131c, these registers output three bits $Q_A$, $Q_B$ and $Q_C$, respectively. These three bits represent three consecutive pixels to be printed in the vertical direction, i.e., the sub-scanning direction. In other words, the shift registers 131a, 131b and 131c cooperate to sample every three bits of the image data, which represent three consecutive pixels to be formed on a printing medium and be aligned in the vertical direction, or the direction of the sub-scanning.

The three bits $Q_A$, $Q_B$ and $Q_C$ output from the registers 131a, 131b and 131c, respectively, are supplied to the power-supply time setting device 132.

The power-supply time setting device 132 has a ROM (not shown), and outputs a 3-bit data item consisting of the bits $Q_A$, $Q_B$ and $Q_C$ output from the shift registers 131a, 131b and 131c. The 3-bit data item is stored into the line memory 133. The line memory 133 has capacity of n 3-bit data items, where n is the number of pixels forming one horizontal line. The output controller 134 controls the line memory 133 in accordance with the clock signal and the latch signal supplied from the head controller 10, causing the line memory 133 to output pixel bits, one by one.

The operation of the thermal printer shown in FIG. 16 will now be explained, with reference to the timing chart of FIG. 17.

First, image data is supplied from the external device to the head controller 10. The head controller 10 supplies the image data to the image data processing section 130, and generates a timing signal, a clock signal CK, and a latch signal LA. The timing signal is input to the enable signal generator 20, the clock signal CK is supplied to the output controller 134 and the shift register 41 incorporated in the head driver 40, and the latch circuit LA is supplied to the output controller 134 and the latch circuit 42 incorporated in the head driver 40.

Upon receipt of the timing signal, the enable signal generator 20 generates an enable signal EN. The enable signal EN is supplied to the second input terminals of the AND gates 43-1 to 43-n incorporated i the head driver 40.

In the image processing section 130, the shift registers 131a, 131b and 131c output three bits $Q_A$, $Q_B$ and $Q_C$ for each pixel bit, to the power-supply time setting device 132. These bits $Q_A$, $Q_B$ and $Q_C$ represent three consecutive pixels to be formed on a printing medium and be aligned in the vertical direction, i.e., sub-scanning direction. The power-supply time setting device 132 outputs a 3-bit data item which represents the combination of the bits $Q_0$, $Q_1$ and $Q_2$, in terms of the values thereof.

More specifically, the device 132 produces 3-bit data items in the following scheme:

1. When the three bits are "0", "1" and "0", indicating that only the middle pixel is black as is shown at (a) in FIG. 12, the device 132 produces a 3-bit data of "001."
2. When the three bits are "1", "1" and "0", indicating that the middle and upper pixels are black as is shown at (b) in FIG. 12, the device 132 produces a 3-bit data of "010."
3. When the three bits are "0", "1" and "1", indicating that the middle and the lower pixels are black as is shown at (c) in FIG. 12, the device 132 produces a 3-bit data of "010."
4. When the three bits are "1", "1" and "1", indicating that all three pixels are black as is shown at (d) in FIG. 12, the device 132 produces a 3-bit data of "100."
5. When the bit $Q_B$ is "0", indicating that the middle pixel is white, the device 132 produces a 3-bit data of "000."

The 3-bit data item is stored into the line memory 133. As each of the shift registers 131a, 131b and 131c sequentially inputs other bits to the power-supply time setting device 132, the device 132 outputs other 3-bit data items, each for one pixel bit. These 3-bit data items are stored into the line memory 133, one after another.

In accordance with the clock signal CK, the output controller 134 control the line memory 133, whereby only the first bit (i.e., the least significant bit) of each 3-bit data item is read from the memory 133. The first bit of each 3-bit data item is supplied to the head driver 40.

In the head driver 40, n bits read from the line memory 133, each being the first bit of each 3-bit data item, are stored into the shift register 41, one after another, during the period I as is shown in FIG. 17. When the last of these n bits is stored into the register 41, the head controller 10 outputs a latch signal pulse II having a predetermined width, as can be understood from FIG. 9. This pulse II is supplied to the latch circuit 42 and also to the output controller 134. In response to the pulse II, the latch circuit 42 receives and holds the n bits from the shift register 41.

In response to the latch signal pulse II, the output controller 134 controls the line memory 133, whereby only the second bit (i.e., the second least significant bit) of each 3-bit data item is read from the memory 133. As a result, n bits, each being the second bit of each 3-bit data item stored in the memory 133, are input to the shift register 41, one after another, during the period III as is shown in FIG. 17.

The enable signal generator 20 generates an enable signal pulse in response to the timing signal supplied from the head controller 10, upon lapse of a predetermined time from the trailing edge of each latch signal pulse, as can be understood from FIG. 17. Hence, the generator 20 generates an enable signal pulse IV having a width $T_A$ upon lapse of said time from the trailing edge of the latch signal pulse II. This pulse IV is supplied to the second input terminal of each AND gate.

In the meantime, the n bits $Q_0$ to $Q_n$ held in the latch circuit 42, each being the first bit of each 3-bit data item stored in the line memory 133, are input to the AND gates 43-1 to 43-n, respectively. Hence, any AND gate, whose first input terminal receives a "1" bit which indicates that only the middle of the three consecutive pixels is black, is on for the period $T_A$, i.e., the width of the enable signal pulse IV. As a result, the switching amplifier coupled to such AND gate is turned on for the same period $T_A$, applying the voltage (24V) to the corresponding heating resistor of the thermal print head 50.

When the last of the n bits, each being the second bit of each 3-bit data item stored in the line memory 133, is input to the shift register 41, the head controller 10 outputs a latch signal pulse V as is shown in FIG. 17. The pulse V is supplied to the output controller 134 and the latch circuit 41. In response to this pulse V, the latch circuit 42 receives and holds the n bits from the shift register 41.

In response to the latch signal pulse V, the output controller 134 controls the line memory 133, whereby only the third bit (i.e., the most significant bit) of each 3-bit data item is read from the memory 133. As a result, n bits, each being the third bit of each 3-bit data item stored in the memory 133, are input to the shift register 41, one after another, during the period VI as is shown in FIG. 17.

Upon lapse of the predetermined time from the trailing edge of the latch signal pulse V, the generator 20 generates an enable signal pulse VII having a width $T_B$. This pulse VII is supplied to the second input terminal of each AND gate.

Meanwhile, the n bits $Q_0$ to $Q_n$ held in the latch circuit 42, each being the second bit of each 3-bit data item stored in the line memory 133, are input to the AND gates 43-1 to 43-n, respectively. Hence, any AND gate, whose first input terminal receives a "1" bit which indicates that the middle and left or right of the three consecutive pixels are black, is on for the period $T_B$, i.e., the width of the enable signal pulse VII. The switching amplifier coupled to such AND gate is thereby turned on for the same period $T_B$, applying the voltage (24V) to the corresponding heating resistor of the thermal print head 50.

When the last of the n bits, each being the third bit of each 3-bit data item stored in the line memory 133, is input to the shift register 41, the head controller 10 outputs a latch signal pulse VIII as is shown in FIG. 17. The pulse VIII is supplied to the output controller 134 and the latch circuit 41. In response to this pulse VIII, the latch circuit 42 receives and holds the n bits from the shift register 41.

In response to the latch signal pulse VIII, the output controller 134 controls the line memory 133, whereby only the first bit (i.e., the least significant bit) of each 3-bit data item of the next one-line data is read from the memory 133. As a result, n bits, each being the first bit of each 3-bit data item stored in the memory 133, are input to the shift register 41, one after another.

Upon lapse of the predetermined time from the trailing edge of the latch signal pulse VIII, the generator 20 generates an enable signal pulse XI having a width $T_C$. This pulse XI is supplied to the second input terminal of each AND gate.

In the meantime, the n bits $Q_0$ to $Q_n$ held in the latch circuit 42, each being the third bit of each 3-bit data item stored in the line memory 133, are input to the AND gates 43-1 to 43-n, respectively. Hence, any AND gate, whose first input terminal receives a "1" bit which indicates that the three consecutive pixels are black, is on for the period $T_C$, i.e., the width of the enable signal pulse XI. The switching amplifier coupled to such AND gate is thereby turned on for the same period $T_C$ applying the voltage (24V) to the corresponding heating resistor of the thermal print head 50.

The enable signal generator 20 cyclically generates three pulses having widths $T_A$, $T_B$ and $T_C$, where $T_A < T_B < T_C$. The widths $T_A$, $T_B$ and $T_C$ defines periods $T_A$, $T_B$ and $T_C$, during which the heating the switching amplifiers 44-1 to 44-n apply the drive voltage to the heating resistors R-1 to R-n of the thermal print head 50.

The image data processing section 130 processes other one-line data items sequentially supplied from the head controller 10, in the specific way explained above. The head driver 40 drives the thermal print head 50 in the manner described above, in accordance with the signals CK and LA supplied from the head controller 10 and also in accordance with the enable signals EN generated by the enable signal generator 20.

As has been described, the 3-bit data output by the power-supply time setting device 132 is "001" when only the middle one of three consecutive pixels is black, is "010" when the middle one and left or right one of three consecutive pixels are black, is "100" when all consecutive three pixels are black, and is "000" when the middle one of the three consecutive pixels is white. In other words, only the first bit of the 3-bit data output by the device 132 is "1" when the middle pixel is black, only the second bit thereof is "1" when the middle pixel and the left or right pixel are black, only the third bit thereof is "1" when all three pixels are black, and none of the three bits are "1" when the middle pixel is white.

Thus, when only the middle pixel is black, the heating resistor is driven for the period $T_A$, printing a small black pixel located well within the one-pixel region. When the middle pixel and the left for right pixel are black, the heating resistor is driven for the period $T_B$ longer than the period $T_A$, thereby printing a black pixel circumscribed by the one-pixel region, as is shown at (a) in FIG. 3. When all three pixels are black, the heating resistor is driven for the period $T_C$ longer than the period $T_B$, thus printing a black pixel circumscribing the one-pixel region, as is illustrated at (a) in FIG. 2. When the middle pixel is white, no voltage is applied to the heating resistor since none of the three bits are "1," and the resistor prints no black pixel.

When the heating resistors R-1 to R-n are repeatedly driven, each time for the period $T_A$ or $T_B$, discrete black pixels, each located well within or circumscribed by the one-pixel region, will be formed on a printing medium, defining a clear-cut quasi-gray image or distinct characters.

On the other hand, when the heating resistors R-1 to R-n are repeatedly driven, each time for the period $T_C$, overlapping black pixels, each circumscribing the one-pixel region, will be formed on a printing medium, defining a true black image.

Fifth Embodiment

Figure 18:
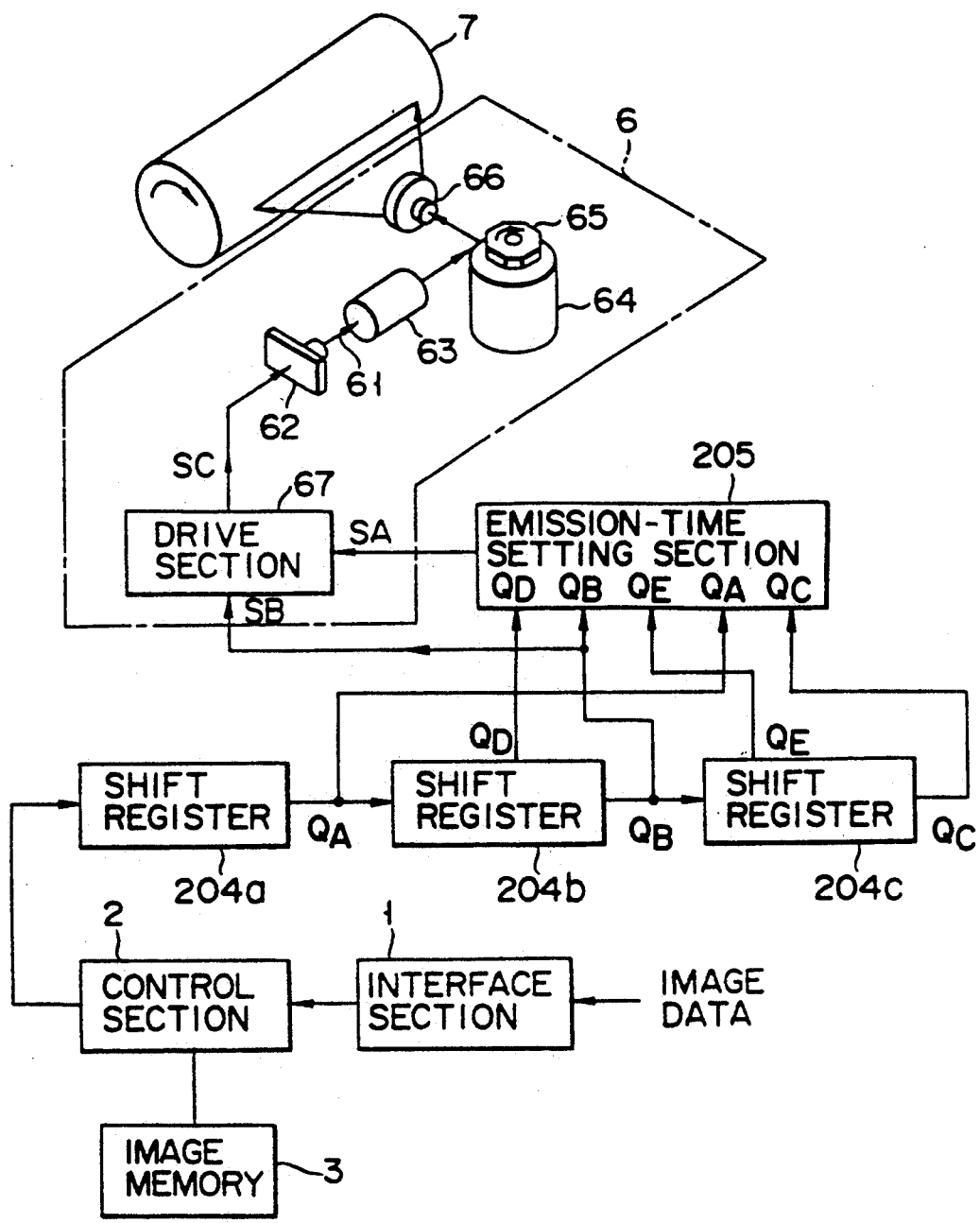
FIG. 18 is a block diagram showing still another laser printer which is a fifth embodiment of this invention.

FIG. 18 illustrates a laser printer which is a fifth embodiment of the invention and which is similar to the laser printer shown in FIG. 4. Some of the components of this printer, which are identical to those shown in FIG. 4 are designated at the same numerals in FIG. 18 and will not be described in detail.

As is evident from FIG. 18, the laser printer comprises an interface section 1, a control section 2, an image memory 3, a laser scanner unit (LSU) 6, a photosensitive drum 7, three shift registers 204a, 204b and 204c, and an emission-time setting section 205.

As in the laser beam shown in FIG. 4, various devices (not shown), such as a drum-charging device, an image-developing device, an image-transferring device, an image-fixing device, a drum-cleaning device—all being of the known types—are located around the photosensitive drum 7.

The shift registers 204a, 204b and 204c are each an n-bit shift register, where m is the number of pixels which form a one-line image. They shift the input data, bit by bit, in response to the transfer clock pulses, i.e., the pulses forming the image data supplied from the control section 2. These registers 204a, 204b and 204c are connected in series. Hence, the output of the register 204a is input to the register 204b, and the output of the register 204b is input to the register 204c. Every time the one-line image data items are shifted by one bit in the registers 204a, 204b and 204c, these registers output three bits $Q_A$, $Q_B$ and $Q_C$, respectively, and the registers 204b and 204c outputs two bits $Q_D$ and $Q_E$ which immediately follows and precedes the bit $Q_B$, respectively. The bits $Q_A$, $Q_B$ and $Q_C$ represent three consecutive pixels to be printed in the vertical direction, i.e., the sub-scanning direction. On the other hand, the bits $Q_B$, $Q_D$ and $Q_E$ represents three consecutive pixels to be printed in the horizontal direction, i.e., the main scanning direction. The five pixels represented by the five bits $Q_A$, $Q_B$, $Q_C$, $Q_D$ and $Q_E$ form a cross, the center of which is defined by the bits $Q_B$. In other words, the shift registers 204a, 204b and 204c cooperate to sample every five bits of the image data, which represent a cross to be printed on a printing medium.

These five bits $Q_A$, $Q_B$, $Q_C$, $Q_D$ and $Q_E$ are supplied from the shift registers 294a, 204b and 204c to the emission-time setting section 205. Further, of these five bits, the bit $Q_B$ is supplied to the drive section 67 incorporated in the LSU 6, as a pixel signal representing a pixel to be printed.

The emission-time setting section 205 has a ROM (not shown) which stores the data table shown in FIG. 19. It detects one of the sixteen 5-pixel patterns shown in FIG. 19, from the values of the bits $Q_A$, $Q_B$, $Q_C$, $Q_D$ and $Q_E$ output from the shift registers 204a, 204b and 204c, and outputs an emission-time signal SA to the LSU 6. The signal SA represents the time for which the LSU 6 is driven to print the pixel corresponding to the bit $Q_B$.

As in the laser beam shown in FIG. 4, various devices (not shown), such as a drum-charging device, an image-developing device, an image-transferring device, an image-fixing device, a drum-cleaning device—all being of the known types—are located around the photosensitive drum 7.

The operation of the laser printer shown in FIG. 18 will now be explained, with reference to FIG. 19 through FIG. 23.

At first, the shift registers 204a, 204b and 204c are empty. Then, the image data is supplied to the shift register 204a, hence to the shift register 204b, and further to the shift register 204c. Thus, the image data is shifted, bit by bit, through the registers 204a, 204b and 204c under the control of the control section 2. As has been described, the shift registers 204a, 204b and 204c are each an n-bit register, capable of storing a one-line data, and are connected in series. Hence, when the shift register 204a starts receiving the third one line data, the shift register 204b outputs the first bit $Q_B$ of the first one-line data to the drive section 67, as pixel signal SB.

The drive section 67 drives the laser diode 62 incorporated in the LSU 6 in response to the pixel signal SB. Meanwhile, the emission-time setting section 205 receives the five bits $Q_A$, $Q_B$, $Q_C$, $Q_D$ and $Q_E$ from the registers 204a, 204b and 204c, detects the 5-pixel pattern from these five bits and outputs an emission-time signal SA which corresponds to one of the data items stored in the ROM. The signal SA is supplied to the drive section 67.

More specifically, the emission-time setting section 205 detects the 5-pixel pattern defined by the bits $Q_A$, $Q_B$, $Q_C$, $Q_D$ and $Q_E$ from the values of these bits which represents five pixels arranged in the form of a cross, the center of which is the pixel represented by the bit $Q_B$. When the bit $Q_B$ is "1," the three bits $Q_A$, $Q_B$ and $Q_C$ can define the sixteen 5-pixel patterns (a) to (p) which are illustrated in FIG. 20 which are stored in the ROM. The 5-pixel patterns are classified into the following three types:

| | |
|---|---|
| Type A: | Only the center pixel is black, or the center pixel and only another pixel is black. |
| Type B: | The center pixel and two or three other pixels are black. |
| Type C: | All five pixels are black. |

When the section 105 detects a 5-pixel pattern of type A, it outputs an emission-time signal SA representing a beam-emission period $T_A$. When it detects a 5-pixel pattern of type B, it generates an emission-time signal SA representing a beam-emission period $T_B$. When it detects the 5-pixel pattern C, it outputs an emission-time signal SA representing a beam-emission period $T_C$.

As is shown in the timing chart of FIG. 21, the drive section 67 outputs a drive signal SC which is at a high level for the period $T_A$, in response to the signal SA representing the period $T_A$; it outputs, a drive signal SC which is at a high level for the period $T_B$, in response to the signal SA representing the period $T_B$; it outputs, a drive signal SC which is at a high level for the period $T_C$, in response to the signal SA showing the period $T_C$. Here, $T_A < T_B < T_C$. The period $T_C$ is equal to a one-pixel scanning period $T_1$.

The drive signal SC is supplied to the laser diode 62 of the LSU 6, thus driving the laser diode 62. When driven for the shortest period $T_A$, the laser diode 62 emits a laser beam for this period $T_A$, whereby a pixel represented by the signal SB is formed on the drum 7, which is small and circumscribed by the one-pixel region as is shown at DA to DL in FIG. 22. When driven for the longer period $T_B$, the laser diode 62 emits a laser beam for the period $T_B$, whereby a pixel represented by the signal SB is formed on the drum 7, which has a diameter longer than the side of the one-pixel region but not long enough to circumscribe the region, as is shown at DM and DN in FIG. 22. When driven for the longest period $T_C$, the laser diode 62 emits a laser beam for this period $T_C$, whereby a pixel is formed on the drum 7, which is large, circumscribing the one-pixel region, as is shown at DO in FIG. 14.

To print a quasi-gray image or complex characters, which are defined by discrete black pixels, the laser diode 62 is repeatedly driven, each time for the period $T_A$ or $T_B$ and emitting a laser beam for this period, whereby discrete black pixels, each circumscribed by the one-pixel region or having a diameter longer than the side of the one-pixel region but not long enough to circumscribe the region, are formed ultimately on a printing medium. The black pixels, thus formed, define a clear-cut quasi-gray image or distinct characters.

On the other hand, to print a true black image, which is defined by overlapping black pixels, the laser diode 62 is repeatedly driven, each time for the period $T_C$ (i.e., one-pixel scanning period $T_1$) and emitting for the period $T_C$, whereby black pixels, each circumscribing the one-pixel region and overlapping another, are formed ultimately on a recording medium. The black pixels, thus formed, define a true black image.

As has been described, the laser diode 62 is driven for the period $T_C$ and forms a large pixel when the five bits $Q_A$, $Q_B$, $Q_C$, $Q_D$ and $Q_E$ supplied from the shift registers 204a, 204b and 204c are all "1," each representing a black pixel, and is driven for the shorter period $T_A$ or $T_B$ and forms a smaller pixel when any one of the five bits, except the bits $Q_B$ is "0," representing a white pixel. Hence, there can be printed a clearly outlined, true black image, as can be understood from FIG. 23.

Sixth Embodiment

FIG. 24 illustrates a thermal printer which is a sixth embodiment of the present invention. As FIG. 24 shows, the thermal printer comprises a head controller 10, an enable signal generator 20, a head driver 40, a thermal print head 50, and an image data processing section 230. All the components, except for the section 230, are identical in both structure and function to those designated at the same reference numerals in FIG. 8.

The image processing section 230 comprises three shift registers 231a, 231b, 231c, a power-supply time setting device 232, a line memory 233, and an output controller 234.

The shift registers 231a, 231b and 231c are each an n-bit shift register, where n is the number of pixels which form a one-line image. They shift the input data, bit by bit, in response to the transfer clock pulses, i.e., the pulses forming the image data supplied from the head controller 10. These registers 231a, 231b and 231c are connected in series. Hence, the output of the register 231a is input to the register 131b, and the output of the register 131b is input to the register 131c. Every time the one-line image data items are shifted by one bit in the registers 231a, 231b and 231c, these registers output three bits $Q_A$, $Q_B$ and $Q_C$, respectively, and the registers 231b and 231c outputs two bits $Q_D$ and $Q_E$ which immediately follows and precedes the bit $Q_B$, respectively. The bits $Q_A$, $Q_B$ and $Q_C$ represent three consecutive pixels to be printed in the vertical direction, i.e., the sub-scanning direction. On the other hand, the bits $Q_B$, $Q_D$ and $Q_E$ represents three consecutive pixels to be printed in the horizontal direction, i.e., the main scanning direction. The five pixels represented by the five bits $Q_A$, $Q_B$, $Q_C$, $Q_D$ and $Q_E$ form a cross, the center of which is defined by the bits $Q_B$. In other words, the shift registers 231a, 231b and 231c cooperate to sample every five bits of the image data, which represent a cross to be printed on a printing medium.

The five bits $Q_A$, $Q_B$, $Q_C$, $Q_D$ and $Q_E$ simultaneously output from the registers 231a, 231b and 231c are supplied to the power-supply time setting device 232.

The power-supply time setting device 232 has a ROM (not shown), and outputs a 3-bit data item upon receipt of the five bits $Q_A$, $Q_B$, $Q_C$, $Q_D$ and $Q_E$ simultaneously output from the registers 231a, 231b and 231c. The 3-bit data item is stored into the line memory 233. The line memory 233 has capacity of n 3-bit data items, where n is the number of pixels forming one horizontal line. The output controller 234 controls the line memory 233 in accordance with the clock signal and the latch signal supplied from the head controller 10, causing the line memory 233 to output pixel bits, one by one, as will be explained below in detail.

The operation of the thermal printer shown in FIG. 24 will now be explained, with reference to the timing chart of FIG. 25.

First, image data is supplied from the external device to the head controller 10. The head controller 10 supplies the image data to the image data processing section 230, and generates a timing signal, a clock signal CK, and a latch signal LA. The timing signal is input to the enable signal generator 20, the clock signal CK is supplied to the output controller 234 and the shift register 41 incorporated in the head driver 40, and the latch circuit LA is supplied to the output controller 234 and the latch circuit 42 incorporated in the head driver 40.

Upon receipt of the timing signal, the enable signal generator 20 generates an enable signal EN. The enable signal EN is supplied to the second input terminals of the AND gates 43-1 to 43-n incorporated in the had driver 40.

In the image processing section 230, the shift registers 231a, 231b and 231c simultaneously output five bits $Q_A$, $Q_B$, $Q_C$, $Q_D$ and $Q_E$. These five bits represent five pixels forming a cross, the bits $Q_A$, $Q_B$ and $Q_C$ representing three consecutive pixels arranged in the vertical direction (i.e., sub-scanning direction), the bits $Q_D$, $Q_B$ and $Q_E$ representing three consecutive pixels arranged in the horizontal direction (i.e., main scanning direction), and the bit $Q_B$ representing the center pixel to be printed on a printing medium. The power-supply time setting device 232 outputs a 3-bit data item the value of which is determined from the values of the five bits $Q_A$, $Q_B$, $Q_C$, $Q_D$ and $Q_E$ simultaneously output from the registers 231a, 231b and 231c. More specifically, the device 232 produces 3-bit data items in the following scheme:

1. When only the bit $Q_B$ represents a black pixel as is shown at (a) in FIG. 20, or when the bit $Q_B$ and another bit represent black pixels as is shown at (b) to (e), the device 232 produces a 3-bit data of "001."

2. When the bit $Q_B$ and two or three other bits represent black pixels as is shown at (f) to (o) in FIG. 20, the device 232 produces a 3-bit data of "010."

3. When all five bits $Q_A$, $Q_B$, $Q_C$, $Q_D$ and $Q_E$ represent black pixels as is shown at (p) in FIG. 20, the device 232 produces a 3-bit data of "100."

4. When the $Q_B$ represents a white pixel, the device 232 produces a 3-bit data of "000."

The 3-bit data item is stored into the line memory 233. As each of the shift registers 231a, 231b and 231c sequentially inputs other bits to the power-supply time setting device 232, the device 232 outputs other 3-bit data items, each for one pixel bit $Q_B$. These 3-bit data items are stored into the line memory 233, one after another.

In accordance with the clock signal CK, the output controller 234 control the line memory 233, whereby only the first bit (i.e., the least significant bit) of each 3-bit data item is read from the memory 233. The first bit of each 3-bit data item is supplied to the head driver 40.

In the head driver 40, n bits read from the line memory 233, each being the first bit of each 3-bit data item, are stored into the shift register 41, one after another, during the period I as is shown in the timing chart of FIG. 25. When the last of these n bits is stored into the register 41, the head controller 10 outputs a latch signal pulse II having a predetermined width, as can be understood from FIG. 25. This pulse II is supplied to the latch circuit 42 and also to the output controller 234. In response to the pulse II, the latch circuit 42 receives and holds the n bits from the shift register 41.

In response to the latch signal pulse II, the output controller 234 controls the line memory 233, whereby only the second bit (i.e., the second least significant bit) of each 3-bit data item is read from the memory 233. As a result, n bits, each being the second bit of each 3-bit data item stored in the memory 233, are input to the shift register 41, one after another, during the period III as is shown in FIG. 25.

The enable signal generator 20 generates an enable signal pulse in response to the timing signal supplied from the head controller 10, upon lapse of a predetermined time from the trailing edge of each latch signal pulse, as can be understood from FIG. 25. Hence, the generator 20 generates an enable signal pulse IV having a width $T_A$ upon lapse of said time from the trailing edge of the latch signal pulse II. This pulse IV is supplied to the second input terminal of each AND gate.

In the meantime, the n bits $Q_0$ to $Q_n$ held in the latch circuit 42, each being the first bit of each 3-bit data item stored in the line memory 233, are input to the AND gates 43-1 to 43-n, respectively. Hence, any AND gate, whose first input terminal receives a "1" bit which indicates that only the middle of the three consecutive pixels is black, is on for the period $T_A$, i.e., the width of the enable signal pulse IV. As a result, the switching amplifier coupled to such AND gate is turned on for the same period $T_A$, applying the voltage (24V) to the corresponding heating resistor of the thermal print head 50.

When the last of the n bits, each being the second bit of each 3-bit data item stored in the line memory 233, is input to the shift register 41, the head controller 10 outputs a latch signal pulse V as is shown in FIG. 25. The pulse V is supplied to the output controller 234 and the latch circuit 41. In response to this pulse V, the latch circuit 42 receives and holds the n bits from the shift register 41.

In response to the latch signal pulse V, the output controller 234 controls the line memory 233, whereby only the third bit (i.e., the most significant bit) of each 3-bit data item is read from the memory 233. As a result, n bits, each being the third bit of each 3-bit data item stored in the memory 233, are input to the shift register 41, one after another, during the period VI as is shown in the timing chart of FIG. 25.

Upon lapse of the predetermined time from the trailing edge of the latch signal pulse V, the generator 20 generates an enable signal pulse VII having a width $T_B$. This pulse VII is supplied to the second input terminal of each AND gate.

Meanwhile, the n bits $Q_0$ to $Q_n$ held in the latch circuit 42, each being the second bit of each 3-bit data item stored in the line memory 33, are input to the AND gates 43-1 to 43-n, respectively. Hence, any AND gate, whose first input terminal receives a "1" bit which indicates that the middle and left or right of the three consecutive pixels are black, is on for the period $T_B$, i.e., the width of the enable signal pulse VII. The switching amplifier coupled to such AND gate is thereby turned on for the same period $T_B$, applying the voltage (24V) to the corresponding heating resistor of the thermal print head 50.

When the last of the n bits, each being the third bit of each 3-bit data item stored in the line memory 233, is input to the shift register 41, the head controller 10 outputs a latch signal pulse VIII as is shown in FIG. 25. The pulse VIII is supplied to the output controller 234 and the latch circuit 41. In response to this pulse VIII, the latch circuit 42 receives and holds the n bits from the shift register 41.

In response to the latch signal pulse VIII, the output controller 234 controls the line memory 233, whereby only the first bit (i.e., the least significant bit) of each 3-bit data item of the next one-line data is read from the memory 233. As a result, n bits, each being the first bit of each 3-bit data item stored in the memory 233, are input to the shift register 41, one after another.

Upon lapse of the predetermined time from the trailing edge of the latch signal pulse VIII, the generator 20 generates an enable signal pulse XI having a width $T_C$. This pulse XI is supplied to the second input terminal of each AND gate.

In the meantime, the n bits $Q_0$ to $Q_n$ held in the latch circuit 42, each being the third bit of each 3-bit data item stored in the line memory 233, are input to the AND gates 43-1 to 43-n, respectively. Hence, any AND gate, whose first input terminal receives a "1" bit which indicates that the three consecutive pixels are black, is on for the period $T_C$, i.e., the width of the enable signal pulse XI. The switching amplifier coupled to such AND gate is thereby turned on for the same period $T_C$ applying the voltage (24V) to the corresponding heating resistor of the thermal print head 50.

The enable signal generator 20 cyclically generates three pulses having widths $T_A$, $T_B$ and $T_C$, where $T_A < T_B < T_C$. The widths $T_A$, $T_B$ and $T_C$ defines periods $T_A$, $T_B$ and $T_C$, during which the heating switching amplifiers 44-1 to 44-n apply the drive voltage to the heating resistors R-1 to R-n of the thermal print head 50.

The image data processing section 230 processes any other one-line data items sequentially supplied from the head controller 10, three data items at a time, in the specific way explained above. The head driver 40 drives the thermal print head 50 in the manner described above, in accordance with the signals CK and LA supplied from the head controller 10 and also in accordance with the enable signals EN generated by the enable signal generator 20.

As has been described, the 3-bit data output by the power-supply time setting section 232 is "001" when only the middle one of the five pixels forming a cross is black or when the middle one and another of the five pixels are black, is "010" when the middle one and two or three others of the five pixels are black, is "100" when all five pixels are black, and is "000" when the middle one of the three consecutive pixels is white. In other words, only the first bit of the 3-bit data output by the device 132 is "1" when the middle pixel is black or when the middle pixel and another adjacent pixel are black, only the second bit thereof is "1" when the middle pixel and two or three adjacent pixels are black, only the third bit thereof is "1" when all five pixels are black, and none of the three bits are "1" when the middle pixel is white.

Thus, when only the middle pixel is black or when the middle pixel and another pixel are black, the heating resistor is driven for the period T A , printing a small black pixel (DA or DC in FIG. 22) circumscribed by the one-pixel region. When the middle pixel and two or three adjacent pixels are black, the heating resistor is driven for the period $T_B$ longer than the period $T_A$, thereby printing a black pixel (DM or DN in FIG. 22)

having a diameter longer than the wide of the one-pixel region but not long enough to circumscribe the region. When all three pixels are black, the heating resistor is driven for the period $T_C$ longer than the period $T_B$, thus printing a black pixel (DO in FIG. 22) circumscribing the one-pixel region. When the middle pixel is white, no voltage is applied to the heating resistor since none of the three bits are "1," and the resistor prints no black pixel.

When the heating resistors R-1 to R-n are repeatedly driven, each time for the period $T_A$ or $T_B$, discrete black pixels, each located well within or circumscribed by the one-pixel region, will be formed on a printing medium, defining a clear-cut quasi-gray image or distinct characters.

On the other hand, when the heating resistors R-1 to R-n are repeatedly driven, each time for the period $T_C$, overlapping black pixels, each circumscribing the one-pixel region, will be formed on a printing medium, defining a true black image.

Seventh Embodiment

Figure 26:
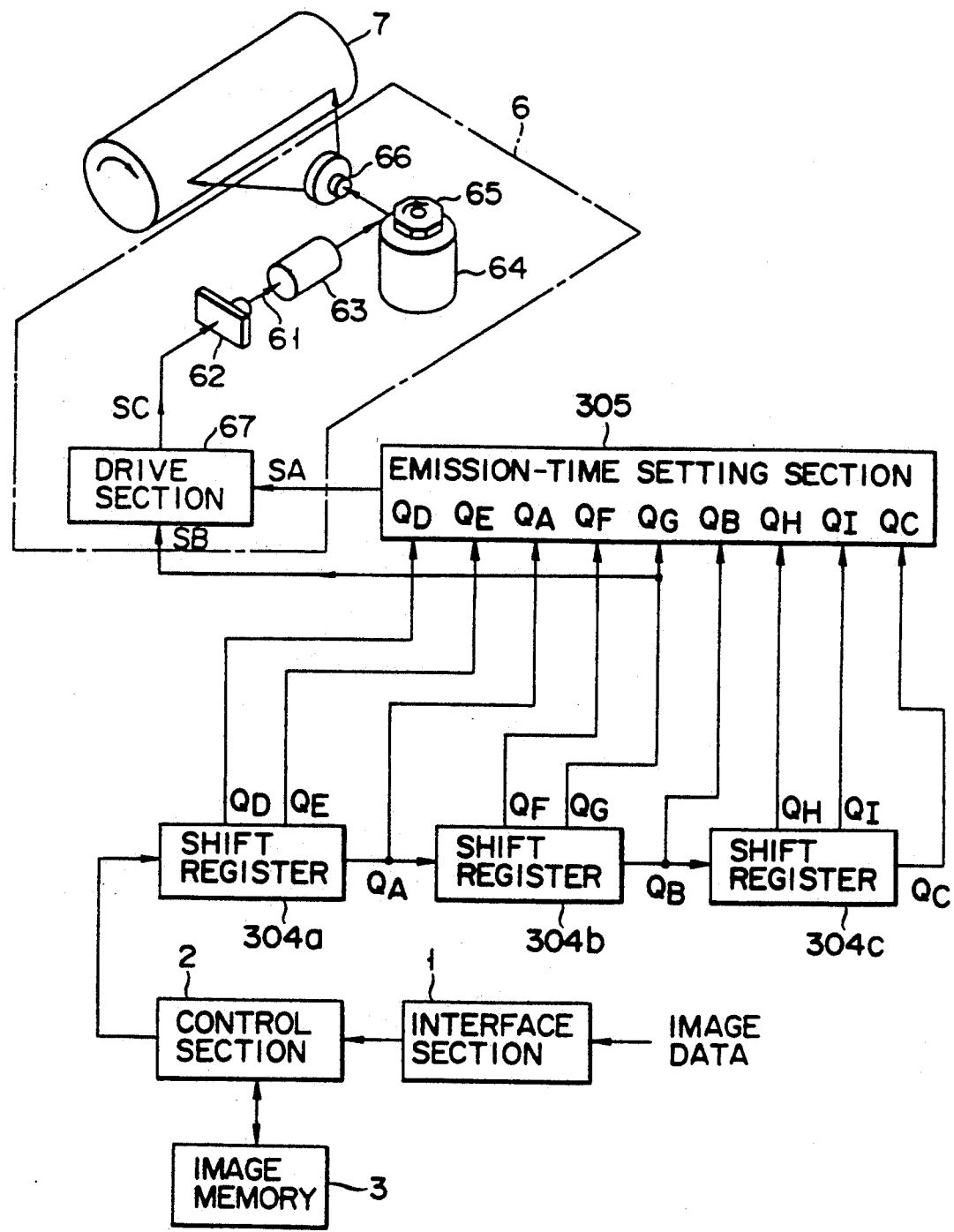
FIG. 26 is a block diagram showing a laser printer according to a seventh embodiment of the invention.

FIG. 26 illustrates a laser printer which is a seventh embodiment of the invention and which is similar to the laser printer shown in FIG. 4. Some of the components of this printer, which are identical to those shown in FIG. 4 are designated at the same numerals in FIG. 26 and will not be described in detail.

As is evident from FIG. 26, the laser printer comprises an interface section 1, a control section 2, an image memory 3, a laser scanner unit (LSU) 6, a photosensitive drum 7, three shift registers 304a, 304b and 304c, and an emission-time setting section 305.

As in the laser beam shown in FIG. 4, various devices (not shown), such as a drum-charging device, an image-developing device, an image-transferring device, an image-fixing device, a drum-cleaning device—all being of the known types—are located around the photosensitive drum 7.

The shift registers 304a, 304b and 304c are each an n-bit shift register, where n is the number of pixels which form a one-line image. They shift the input data, bit by bit, in response to the transfer clock pulses, i.e., the pulses forming the image data supplied from the control section 2. These registers 304a, 304b and 304c are connected in series. Hence, the output of the register 304a is input to the register 304b, and the output of the register 304b is input to the register 304c. Every time the registers 304a, 304b and 304c shift the one-line image data items by one bit, they output three bits $Q_A$, $Q_B$ and $Q_C$, respectively. At the same time, the register 304a also outputs two bits $Q_E$ and $Q_D$ which follows the bit $Q_A$, the register 304b also outputs two bits $Q_G$ and $Q_F$ which follows the bit $Q_B$, and the register 304c also outputs two bits $Q_I$ and $Q_H$ which follows the bit $Q_C$, as can be understood from FIG. 26.

The three bits $Q_A$, $Q_E$ and $Q_D$ simultaneously output from the shift register 304a represent three consecutive ones of the pixels forming a first horizontal line, i.e., the pixels arranged in the main scanning line. The three bits $Q_B$, $Q_G$ and $Q_F$ output from the shift register 304b represent three consecutive ones of the pixels forming a second horizontal line, i.e., the pixels arranged in the main scanning line. The three bits $Q_C$, $Q_I$ and $Q_H$ output from the shift register 304c represent three consecutive ones of the pixels forming a third horizontal line, i.e., the pixels arranged in the main scanning line. Since the shift registers 304a, 304b and 304c, each holding a one-line data item, are connected in series, the bits $Q_A$, $Q_B$ and $Q_C$ output from the registers 304a, 304b and 304c, represent three consecutive pixels arranged in the vertical direction, i.e., the sub-scanning direction; the bits $Q_E$, $Q_G$ and $Q_I$ output from the registers 304a, 304b and 304c, represent three consecutive pixels arranged in the vertical direction; and the bits $Q_D$, $Q_F$ and $Q_H$ output from the registers 304a, 304b and 304c, represent three consecutive pixels arranged in the vertical direction. Hence, the nine bits $Q_A$ to $Q_I$ represent a 3×3 pixel matrix of the type illustrated in FIG. 27, the bit $Q_G$ representing the center pixel of the 3×3 matrix. In other words, the shift registers 304a, 304b, and 304c cooperate to sample every nine bits of the image data, which represent a 3×3 pixel matrix.

These nine bits $Q_A$ to $Q_I$ are supplied from the shift registers 304a, 304b and 304c to the emission-time setting section 205. Further, of these five bits, the bit $Q_G$ is supplied to the drive section 67 incorporated in the LSU 6, as a pixel signal representing a pixel to be printed.

The emission-time setting section 205 has a ROM (not shown) which stores a data table showing various 9-bit patterns and three periods $T_A$, $T_B$ and $T_C$. It detects one of the various patterns which the bits $Q_A$ to $Q_I$ define when the bit $Q_G$ represents a black pixel, in accordance with the values of the bits $Q_A$ to $Q_I$ output from the shift registers 304a, 304b and 304c. Then, it outputs an emission-time signal SA to the LSU 6. The signal SA represents the time for which the LSU 6 is driven to print the pixel corresponding to the bit $Q_G$.

As in the laser beam shown in FIG. 4, various devices (not shown), such as a drum-charging device, an image-developing device, an image-transferring device, an image-fixing device, a drum-cleaning device—all being of the known types—are located around the photosensitive drum 7.

The operation of the laser printer shown in FIG. 26 will now be explained, with reference to FIGS. 28, 29 and 30. At first, the shift registers 304a, 304b and 304c are empty. Then, the image data is supplied to the shift register 304a, hence to the shift register 304b, and further to the shift register 304c. Thus, the image data is shifted, bit by bit, through the registers 304a, 304b and 304c under the control of the control section 2. As has been described, the shift registers 304a, 304b and 304c are each an n-bit register, capable of storing a one-line data, and are connected in series. Hence, when the shift register 304a receives the last bit of the second one-line data, the shift register 304b outputs the bit $Q_G$, which is supplied to the drive section 67, as pixel signal SB.

The drive section 67 drives the laser diode 62 incorporated in the LSU 6 in response to the pixel signal SB. Meanwhile, the emission-time setting section 305 receives the five nine $Q_A$ to $Q_I$ from the registers 304a, 304b and 304c, detects the 9-pixel pattern from these nine bits, and outputs an emission-time signal SA which represents of the periods $T_A$, $T_B$ and $T_C$ stored in the ROM. The signal SA is supplied to the drive section 67.

More specifically, the emission-time setting section 305 detects the 9-pixel pattern defined by the bits $Q_A$ to $Q_I$, from the values of these bits which represents nine pixels forming a 3×3 matrix, the center of which is the pixel represented by the bit $Q_G$. When the bit $Q_G$ is "1," the nine bits $Q_A$ to $Q_I$ can define 256-pixel patterns (=$2^8$ patterns) which are stored in the ROM. The 9-pixel patterns are classified into the following three types:

| | |
|---|---|
| Type A: | Only the center pixel is black, or the center pixel and only another pixel is black. |
| Type B: | The center pixel and three to five other pixels are black. |
| Type C: | The center pixel and six to eight other pixels are black. |

When the section 205 detects a 9-pixel pattern of type A, it outputs an emission-time signal SA representing a beam-emission period $T_A$. When it detects a 9-pixel pattern of type B, it generates an emission-time signal SA representing a beam-emission period $T_B$. When it detects the 9-pixel pattern of pattern C, it outputs an emission-time signal SA representing a beam-emission i period $T_C$.

As is shown in the timing chart of FIG. 28, the drive section 67 outputs a drive signal SC which is at a high level for the period $T_A$, in response to the signal SA representing the period $T_A$; it outputs, a drive signal SC which is at a high level for the period $T_B$, in response to the signal SA representing the period $T_B$; it outputs, a drive signal SC which is at a high level for the period $T_C$, in response to the signal SA showing the period $T_C$. Here, $T_A < T_B < T_C \leq T_1$. The period $T_C$ is equal to a one-pixel scanning period $T_1$ in the present embodiments.

The drive signal SC is supplied to the laser diode 62 of the LSU 6, thus driving the laser diode 62. When driven for the shortest period $T_A$, the laser diode 62 emits a laser beam for this period $T_A$, whereby a pixel represented by the signal SB is formed on the drum 7, which is small and circumscribed by the one-pixel region as is shown at (a), (b) or (c) in FIG. 29. When driven for the longer period $T_B$, the laser diode 62 emits a laser beam for the period $T_B$, whereby a pixel represented by the signal SB is formed on the drum 7, which has a diameter longer than the side of the one-pixel region but not long enough to circumscribe the region, as is shown at (d), (e) and (f) in FIG. 29. When driven for the longest period $T_C$, the laser diode 62 emits a laser beam for this period $T_C$, whereby a pixel is formed on the drum 7, which is large, circumscribing the one-pixel region, as is shown at (g), (h) or (i) in FIG. 29. In FIG. 29, each square indicates a one-pixel region, and any shaded square indicates a one pixel region in which a black pixel is printed if any one of the three possible sizes.

To print a quasi-gray image or complex characters, which are defined by discrete black pixels, the laser diode 62 is repeatedly driven, each time for the period $T_A$ or $T_B$ and emitting a laser beam for this period, whereby discrete black pixels, each circumscribed by the one-pixel region or having a diameter longer than the side of the one-pixel region but not long enough to circumscribe the region, are formed ultimately on a printing medium. The black pixels, thus formed, define a clear-cut quasi-gray image or distinct characters.

On the other hand, to print a true black image, which is defined by overlapping black pixels, the laser diode 62 is repeatedly driven, each time for the period $T_C$ (i.e., one-pixel scanning period $T_1$) and emitting for the period $T_C$, whereby black pixels, each circumscribing the one-pixel region and overlapping another, are formed ultimately on a printing medium. The black pixels, thus formed, define a true black image.

As has been described, the laser diode 62 is driven for the period $T_C$ and forms a large pixel when six or more adjacent pixels are black ones, and is driven for the shorter period $T_A$ or $T_B$ and forms a smaller pixel when five or less adjacent pixels are black ones. Hence, there can be printed a clearly outlined, true black image, as can be understood from FIG. 30.

Eighth Embodiment

Figure 31:
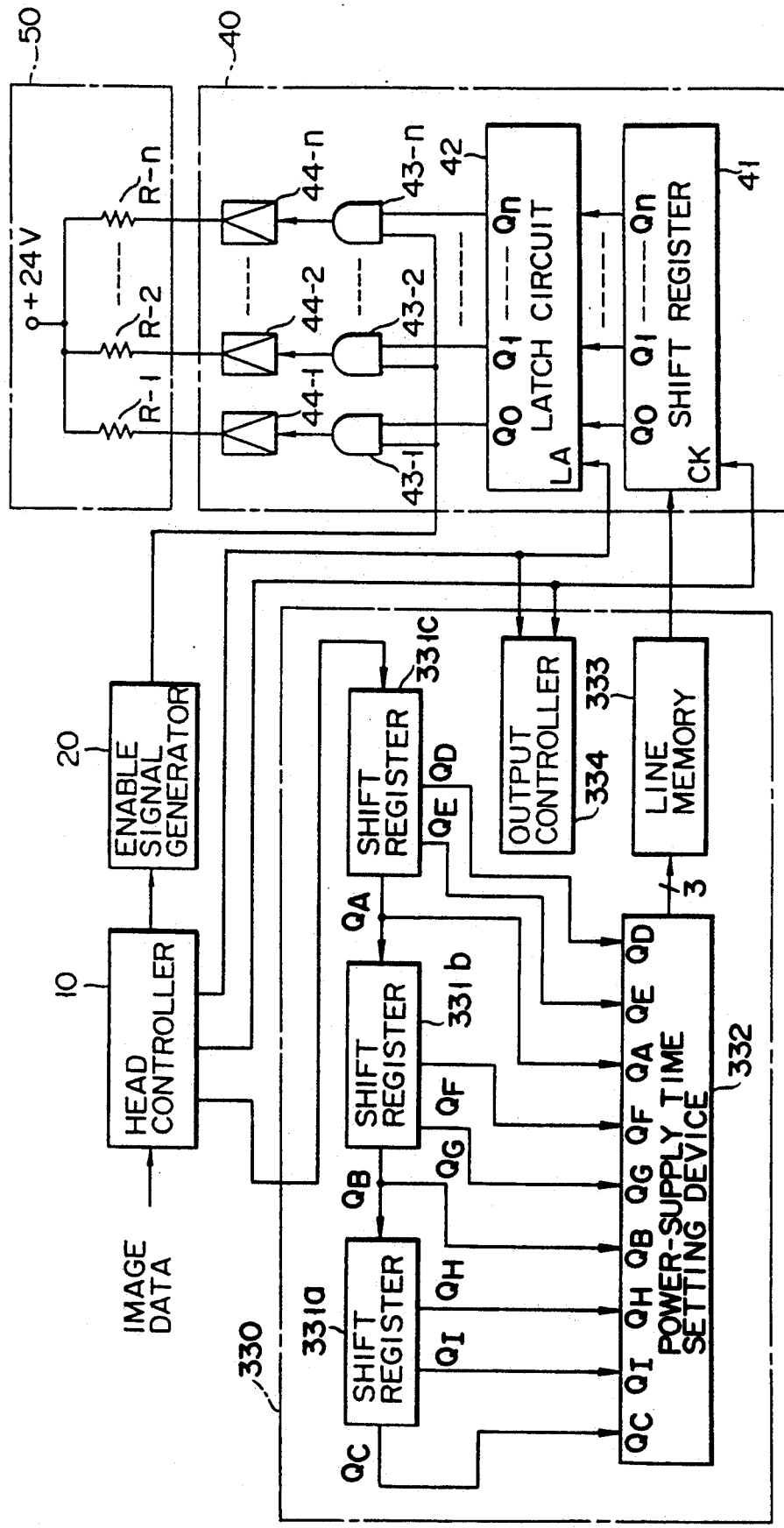
FIG. 31 is a block diagram showing a thermal printer which is an eighth embodiment of the invention.

FIG. 31 illustrates a thermal printer which is a eighth embodiment of the present invention. As FIG. 31 shows, the thermal printer comprises a head controller 10, an enable signal generator 20, a head driver 40, a thermal print head 50, and an image data processing section 330. All the components, except for the section 330, are identical in both structure and function to those designated at the same reference numerals in FIG. 8.

The image processing section 330 comprises three shift registers 331a, 331b, 331c, a power-supply time setting device 332, a line memory 333, and an output controller 334.

The shift registers 331a, 331b and 331c are each an n-bit shift register, where n is the number of pixels which form a one-line image. They shift the input data, bit by bit, in response to the transfer clock pulses, i.e., the pulses forming the image data supplied from the head controller 10. These registers 331a, 331b and 331c are connected in series. Hence, the output of the register 331a is input to the register 331b, and the output of the register 331b is input to the register 331c. Every time the one-line image data items are shifted by one bit in the registers 331a, 331b and 331c, these registers output three bits $Q_A$, $Q_B$ and $Q_C$, respectively. At the same time, the register 331a also outputs two bits $Q_E$ and $Q_D$ which follows the bit $Q_A$, the register 331b also outputs two bits $Q_G$ and $Q_F$ which follows the bit $Q_B$, and the register 331c also outputs two bits $Q_I$ and $Q_H$ which follows the bit $Q_C$, as can be understood from FIG. 31.

The three bits $Q_A$, $Q_E$ and $Q_D$ output from the shift register 331a represent three consecutive ones of the pixels forming a first horizontal line, i.e., the pixels arranged in the main scanning line. The three bits $Q_B$, $Q_G$ and $Q_F$ output from the shift register 331b represent three consecutive ones of the pixels forming a second horizontal line, i.e., the pixels arranged in the main scanning line. The three bits $Q_C$, $Q_I$ and $Q_H$ output from the shift register 331c represent three consecutive ones of the pixels forming a third horizontal line, i.e., the pixels arranged in the main scanning line. Since the shift registers 331a, 331b and 331c, each holding a one-line data item, are connected in series, the bits $Q_A$, $Q_B$ and $Q_C$ output from the registers 331a, 331b and 331c, represent three consecutive pixels arranged in the vertical direction, i.e., the sub-scanning direction; the bits $Q_E$, $Q_G$ and $Q_I$ output from the registers 331a, 331b and 331c, represent three consecutive pixels arranged in the vertical direction; and the bits $Q_D$, $Q_F$ and $Q_H$ output from the registers 331a, 331b and 331c, represent three consecutive pixels arranged in the vertical direction. Hence, the nine bits $Q_A$ to $Q_I$ represent a $3 \times 3$ pixel matrix of the type illustrated in FIG. 27, the bit $Q_G$ representing the center pixel of the $3 \times 3$ matrix. In other words, the shift registers 331a, 3031, and 331c cooperate to sample every nine bits of the image data, which represent a $3 \times 3$ pixel matrix.

The nine bits $Q_A$ to $Q_I$, thus output from the shift registers 331a, 331b and 331c, are input supplied to the power-supply time setting device 332.

The power-supply time setting device 332 has a ROM (not shown), and outputs a 3-bit data item consisting of three bits upon receipt of the nine bits $Q_A$ to $Q_I$ supplied from the registers 331a, 331b and 331c. The 3-bit data item is stored into the line memory 333. The line memory 333 has capacity of n 3-bit- data items, where n is the number of pixels forming one horizontal line. The output controller 334 controls the line memory 333 in accordance with the clock signal and the latch signal supplied from the head controller 10, causing the line memory 333 to output pixel bits, one by one, as will be explained below in detail.

The operation of the thermal printer shown in FIG. 31 will now be explained, with reference to the timing chart of FIG. 32.

First, image data is supplied from the external device to the head controller 10. The head controller 10 supplies the image data to the image data processing section 330, and generates a timing signal, a clock signal CK, and a latch signal LA. The timing signal is input to the enable signal generator 20, the clock signal CK is supplied to the output controller 334 and the shift register 41 incorporated in the head driver 40, and the latch circuit LA is supplied to the output controller 334 and the latch circuit 42 incorporated in the head driver 40.

Upon receipt of the timing signal, the enable signal generator 20 generates an enable signal EN. The enable signal EN is supplied to the second input terminals of the AND gates 43-1 to 43-n incorporated in the had driver 40.

In the image processing section 330, the shift registers 331a, 331b and 331c output nine bits $Q_A$ to $Q_I$. These nine bits, which represent a 3×3 pixel matrix, are supplied to the power-supply time setting device 332. The device 232 outputs a 3-bit data item the value of which is determined from the values of the nine bits $Q_A$ to $Q_I$ output from the registers 331a, 331b and 331c. More specifically, the device 332 produces 3-bit data items in the following scheme:

1. When only the bit $Q_G$ represents a black pixel as is shown at (a) in FIG. 29, or when the bit $Q_G$ and one or two other bits represent black pixels as is shown at (b) or (c) in FIG. 29, the device 332 produces a 3-bit data of "001."

2. When the bit $Q_G$ and three to five other bits represent black pixels as is shown at (d) to (f) in FIG. 29, the device 332 produces a 3-bit data of "010."

3. When the bit $Q_G$ and six to eight other bits represent black pixels as is shown at (g) and (h) in FIG. 29, the device 332 produces a 3-bit data of "100."

4. When the $Q_g$ represents a white pixel, the device 332 produces a 3-bit data of "000."

The 3-bit data item is stored into the line memory 333. As each of the shift registers 331a, 331b and 331c sequentially inputs other bits to the power-supply time setting device 332, the device 332 outputs other 3-bit data items, each for one pixel bit $Q_G$. These 3-bit data items are stored into the line memory 233, one after another.

In accordance with the clock signal CK, the output controller 334 control the line memory 333, whereby only the first bit (i.e., the least significant bit) of each 3-bit data item is read from the memory 333. The first bit of each 3-bit data item is supplied to the head driver 40.

In the head driver 40, n bits read from the line memory 333, each being the first bit of each 3-bit data item, are stored into the shift register 41, one after another, during the period I as is shown in the timing chart of FIG. 32. When the last of these n bits is stored into the register 41, the head controller 10 outputs a latch signal pulse II having a predetermined width, as can be understood from FIG. 32. This pulse II is supplied to the latch circuit 42 and also to the output controller 334. In response to the pulse II, the latch circuit 42 receives and holds the n bits from the shift register 41.

In response to the latch signal pulse II, the output controller 334 controls the line memory 333, whereby only the second bit (i.e., the second least significant bit) of each 3-bit data item is read from the memory 333. As a result, n bits, each being the second bit of each 3-bit data item stored in the memory 333, are input to the shift register 41, one after another, during the period III as is shown in FIG. 32.

The enable signal generator 20 generates an enable signal pulse in response to the timing signal supplied from the head controller 10, upon lapse of a predetermined time from the trailing edge of each latch signal pulse, as can be understood from FIG. 32. Hence, the generator 20 generates an enable signal pulse IV having a width $T_A$ upon lapse of said time from the trailing edge of the latch signal pulse II. This pulse I is supplied to the second input terminal of each AND gate.

In the meantime, the n bits $Q_0$ to $Q_n$ held in the latch circuit 42, each being the first bit of each 3-bit data item stored in the line memory 333, are input to the AND gates 43-1 to 43-n, respectively. Hence, any AND gate, whose first input terminal receives a "1" bit which indicates that only the middle of the three consecutive pixels is black, is on for the period $T_A$, i.e., the width of the enable signal pulse IV. As a result, the switching amplifier coupled to such AND gate is turned on for the same period $T_A$, applying the voltage (24V) to the corresponding heating resistor of the thermal print head 50.

When the last of the n bits, each being the second bit of each 3-bit data item stored in the line memory 333, is input to the shift register 41, the head controller 10 outputs a latch signal pulse V as is shown in FIG. 32. The pulse V is supplied to the output controller 334 and the latch circuit 41. In response to this pulse V, the latch circuit 42 receives and holds the n bits from the shift register 41.

In response to the latch signal pulse V, the output controller 334 controls the line memory 333, whereby only the third bit (i.e., the most significant bit) of each 3-bit data item is read from the memory 333. As a result, n bits, each being the third bit of each 3-bit data item stored in the memory 333, are input to the shift register 41, one after another, during the period VI as is shown in the timing chart of FIG. 32.

Upon lapse of the predetermined time from the trailing edge of the latch signal pulse V, the generator 20 generates an enable signal pulse VII having a width $T_B$. This pulse VII is supplied to the second input terminal of each AND gate.

Meanwhile, the n bits $Q_0$ to $Q_n$ held in the latch circuit 42, each being the second bit of each 3-bit data item stored in the line memory 333, are input to the AND gates 43-1 to 43-n, respectively. Hence, any AND gate, whose first input terminal receives a "1" bit which indicates that the middle and left or right of the three consecutive pixels are black, is on for the period $T_B$, i.e., the width of the enable signal pulse VII. The switching amplifier coupled to such AND gate is thereby turned on for the same period $T_B$, applying the voltage (24V) to the corresponding heating resistor of the thermal print head 50.

When the last of the n bits, each being the third bit of each 3-bit data item stored in the line memory 333, is input to the shift register 41, the head controller 10 outputs a latch signal pulse VIII as is shown in FIG. 32. The pulse VIII is supplied to the output controller 334 and the latch circuit 41. In response to this pulse VIII, the latch circuit 42 receives and holds the n bits from the shift register 41.

In response to the latch signal pulse VIII, the output controller 334 controls the line memory 333, whereby only the first bit (i.e., the least significant bit) of each 3-bit data item of the next one-line data is read from the memory 333. As a result, n bits, each being the first bit of each 3-bit data item stored in the memory 333, are input to the shift register 41, one after another.

Upon lapse of the predetermined time from the trailing edge of the latch signal pulse VIII, the generator 20 generates an enable signal pulse XI having a width $T_C$. This pulse XI is supplied to the second input terminal of each AND gate.

In the meantime, the n bits $Q_0$ to $Q_n$ held in the latch circuit 42, each being the third bit of each 3-bit data item stored in the line memory 333, are input to the AND gates 43-1 to 43-n, respectively. Hence, any AND gate, whose first input terminal receives a "1" bit which indicates that the three consecutive pixels are black, is on for the period $T_C$, i.e., the width of the enable signal pulse XI. The switching amplifier coupled to such AND gate is thereby turned on for the same period $T_C$ applying the voltage (24V) to the corresponding heating resistor of the thermal print head 50.

The enable signal generator 20 cyclically generates three pulses having widths $T_A$, $T_B$ and $T_C$, where $T_A<T_B<T_C$. The widths $T_A$, $T_B$ and $T_C$ defines periods $T_A$, $T_B$ and $T_C$, during which the heating the switching amplifiers 44-1 to 44-n apply the drive voltage to the heating resistors R-1 to R-n of the thermal print head 50.

The image data processing section 330 processes any other one-line data items sequentially supplied from the head controller 10, three data items at a time, in the specific way explained above. The head driver 40 drives the thermal print head 50 in the manner described above, in accordance with the signals CK and LA supplied from the head controller 10 and also in accordance with the enable signals EN generated by the enable signal generator 20.

Thus, when only the middle pixel is black or when the middle pixel and one or two adjacent pixels are black, the heating resistor is driven for the period $T_A$, printing a small black pixel circumscribed by the one-pixel region, as is shown at (a), (b) and (c) in FIG. 29. When the middle pixel and three to five adjacent pixels are black, the heating resistor is driven for the period $T_B$ longer than the period $T_A$, thereby printing a black pixel having a diameter longer than the wide of the one-pixel region but not long enough to circumscribe the region, as is shown at (d), (e) and (f) in FIG. 29. When the middle pixel and six to eight adjacent pixels are black, the heating resistor is driven for the period $T_C$ longer than the period $T_B$, thus printing a black pixel circumscribing the one-pixel region, as is shown at (g), (h) or (i) in FIG. 29. When the middle pixel is white, no voltage is applied to the heating resistor since none of the three bits are "1," and the resistor prints no black pixel.

When the heating resistors R-1 to R-n are repeatedly driven, each time for the period $T_A$ or $T_B$, discrete black pixels, each located well within or circumscribed by the one-pixel region, will be formed on a printing medium, defining a clear-cut quasi-gray image or distinct characters.

On the other hand, when the heating resistors R-1 to R-n are repeatedly driven, each time for the period $T_C$, overlapping black pixels, each circumscribing the one-pixel region, will be formed on a printing medium, defining a true black image.

Ninth Embodiment

Figure 33:
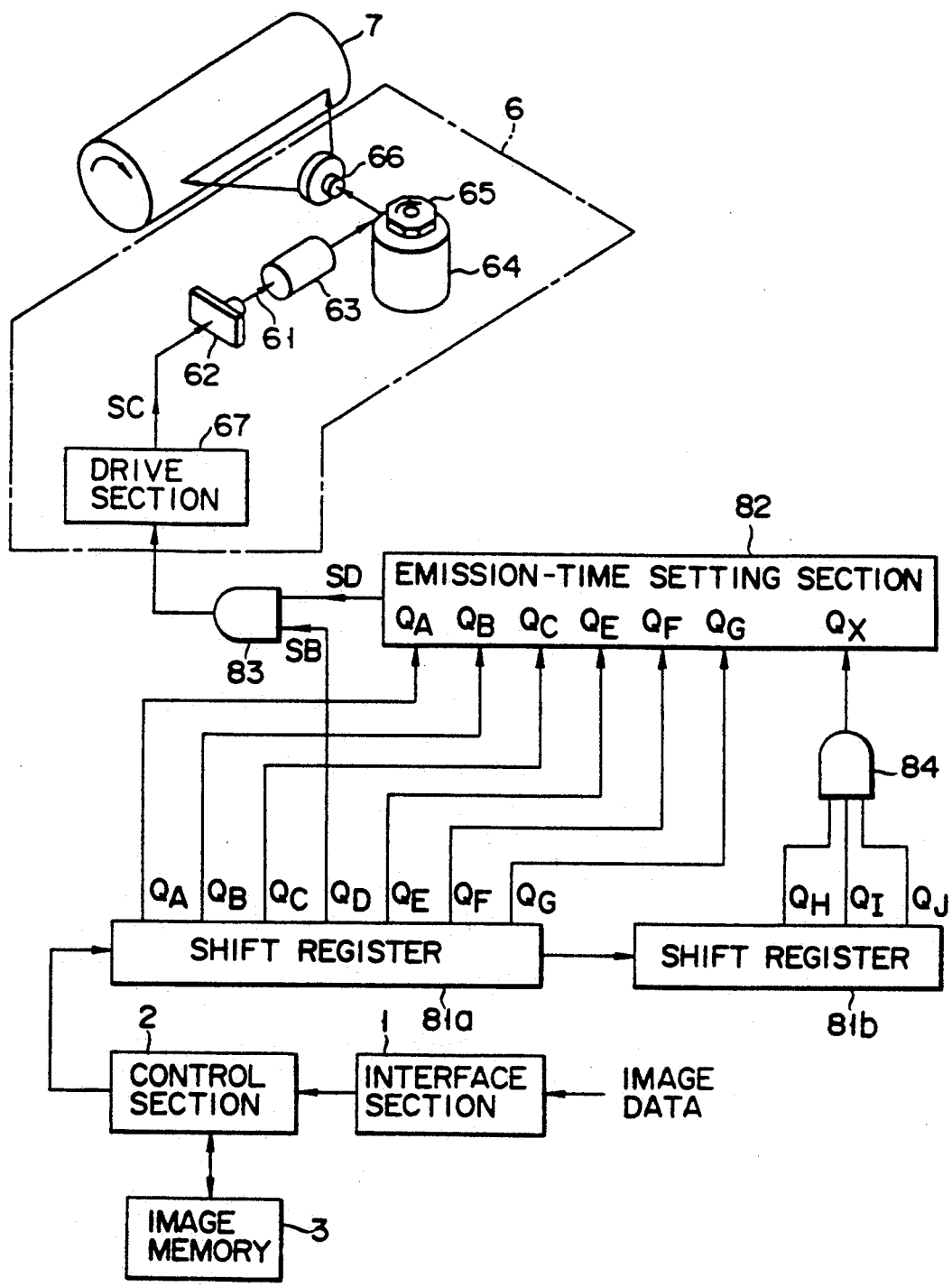
FIG. 33 is a block diagram illustrating another laser printer which is the ninth embodiment of the present invention.

FIG. 33 illustrates a laser printer which is a ninth embodiment of the invention and which is similar to the laser printer shown in FIG. 4. Some of the components of this printer, which are identical to those shown in FIG. 4 are designated at the same numerals in FIG. 33 and will not be described in detail.

As is evident from FIG. 33, the laser printer comprises an interface section 1, a control section 2, an image memory 3, a laser scanner unit (LSU) 6, a photosensitive drum 7, two shift registers 81a and 81b, an emission-time setting section 81, a 2-input AND gate 84, and 3-input AND gate 84.

As in the laser beam shown in FIG. 4, various devices (not shown), such as a drum-charging device, an image-developing device, an image-transferring device, an image-fixing device, a drum-cleaning device—all being of the known types—are located around the photosensitive drum 7.

The shift registers 81a and 81b are each an n-bit shift register, where n is the number of pixels which form a one-line image. They shift the input data, bit by bit, in response to the transfer clock pulses, i.e., the pulses forming the image data supplied from the control section 2. These registers 81a and 81b are connected in series. Hence, the output of the register 81a is input to the register 81b. Every time the register 81a shifts the one-line image data by one bit, it outputs the first seven bits it holds, i.e., bits $Q_A$ to $Q_G$. Of these seven bits, the bits $Q_A$, $Q_B$, $Q_C$, $Q_E$, $Q_F$ and $Q_G$ are supplied to the emission-time setting section 82, while the bit $Q_D$ is supplied as a pixel signal SB to the first input terminal of the AND gate 83. On the other hand, every time the register 81b shifts the one-image data by one bit, it outputs three consecutive bits $Q_H$, $Q_I$ and $Q_J$ which are at the same places as the bits $Q_C$, $Q_D$ and $Q_E$, respectively. These three bits $Q_H$, $Q_I$ and $Q_J$ are supplied to the three input terminals of the AND gate 84, respectively. The bit $Q_X$ output by the AND gate 84 is supplied to the emission-time setting section 82.

The seven bits $Q_A$ to $Q_G$ output by the shift register 81a, and the three bits $Q_H$, $Q_I$ and $Q_J$ output by the shift register 81b represent ten pixels A to J have the positional relation specified in FIG. 34.

The emission-time setting section 305 has a ROM (not shown) which stores a data table showing various 10-bit patterns and seven periods $T_A$ to $T_G$. It detects one of the various patterns which the 10 bits $Q_A$ to $Q_J$ define when the bit $Q_D$ represents a black pixel, in accordance with the values of the bits $Q_A$, $Q_B$, $Q_C$, $Q_E$, $Q_F$ and $Q_G$ supplied from the register 81a and the bit $Q_X$ supplied from the AND gate 84. Then, it outputs an emission-time signal SD representing the period of time which is determined from the values of these input seven bits and for which the LSU 6 is driven to print the pixel represented by the bit $Q_D$. The signal SD is supplied to the second input terminal of the AND gate 83.

The AND gate 83 obtains the logic product of the pixel signal SB (i.e., the bit $Q_D$) output from the shift register 81a and the signal SD output from the emission-time setting section 82, and output a signal representing this logic product. The signal output by the AND gate 83 is supplied to the drive section 67 incorporated in the LSU 6.

As in the laser beam shown in FIG. 4, various devices (not shown), such as a drum-charging device, an image-developing device, an image-transferring device, an image-fixing device, a drum-cleaning device—all being of the known types—are located around the photosensitive drum 7.

The operation of the laser printer shown in FIG. 33 will now be explained, with reference to FIGS. 35 and 36.

At first, the shift registers 81a and 82b are empty. Then, the image data is supplied to the shift register 81a, and hence to the shift register 81b. Thus, the image data is shifted, bit by bit, through either register under the control of the control section 2. As has been described, the shift registers 81a and 18b are each an n-bit register, capable of storing a one-line data, and are connected in series. Hence, when the shift register 81a receives the first bit of the second one-line data, the shift register 81b starts receiving the first one-line data.

The drive section 67 incorporated in the LSU 6 drives the laser diode 62 incorporated in the LSU 6 in response to the pixel signal SB, i.e., the bit $Q_D$, supplied from the shift register 81a through the AND gate 83.

Meanwhile, the emission-time setting section 82 receives six bits $Q_A$ to $Q_C$ and $Q_E$ to $Q_G$ output by the shift register 81a and the $Q_X$ output by the shift register 81b, detects the 10-pixel pattern from the values of the seven input bits, and outputs an emission-time signal SD which represents of one of the seven periods $T_A$ to $T_G$ stored in the ROM. The signal SD is supplied to the drive section 67.

More specifically, the ROM of the emission-time setting section 82 stores the data table shown in FIG. 35. This table shows the relation between the number of consecutive black pixels, always including the black pixel represented by the bit $Q_D$, on the one hand, and the period of time for which the drive section 67 will drive the laser diode 62 to print the black pixel represented by the bit $Q_D$.

As can be understood form FIG. 35, when only one pixel (i.e., the one represented by the bit $Q_D$) is black, the bits $Q_A$ to $Q_C$ and $Q_E$ to $Q_G$ output by the register 81a can form only one 6-bit pattern "000000." When two consecutive pixels are black, the bits $Q_A$ to $Q_C$ and $Q_E$ to $Q_G$ can form two 6-bit patterns "000100" and "001000." When three consecutive pixels are black, the bits $Q_A$ to $Q_C$ and $Q_E$ to $Q_G$ can form three 6-bit patterns "000110," "001100," and "011000." When four consecutive pixels are black, the bits $Q_A$ to $Q_C$ and $Q_E$ to $Q_G$ can form four 6-bit patterns "bits are "000111," "001110," "011100," and "111000." When five consecutive pixels are black, the bits $Q_A$ to $Q_C$ and $Q_E$ to $Q_G$ can form three 6-bit patterns "001111," "011110," and "111100." When six consecutive pixels are black, the bits $Q_A$ to $Q_C$ and $Q_E$ to $Q_G$ can form two 6-bit patterns "011111" and "111110." When seven consecutive pixels are black, the bits $Q_A$ to $Q_C$ and $Q_E$ to $Q_G$ can form only one 6-bit pattern "111111."

When the section 82 detects the 6-bit pattern showing there is only one black pixel, it outputs an emission-time signal SD representing a beam-emission period $T_A$, whether the bit $Q_X$ is "1" or "0." When the section 82 detects a 6-bit pattern showing there are two consecutive black pixels, it generates an emission-time signal SD which represents a beam-emission period $T_B$, whether the bit $Q_X$ is "1" or "0." When the section 82 detects a 6-bit pattern showing there are three consecutive black pixels, it generates an emission-time signal SD which represents a beam-emission period $T_C$, whether the bit $Q_X$ is "1" or "0." When the section 82 detects a 6-bit pattern showing there are four consecutive black pixels, it generates an emission-time signal SD which represents a beam-emission period $T_D$, whether the bit $Q_X$ is "1" or "0." When the section 82 detects a 6-bit pattern showing there are five consecutive black pixels, it generates an emission-time signal SD which represents a beam-emission period $T_E$ if the bit $Q_X$ is "1" or a beam-emission period $T_D$ if the bit $Q_X$ is "0." When the section 82 detects a 6-bit pattern showing there are six consecutive black pixels, it generates an emission-time signal SD which represents a beam-emission period $T_F$ if the bit $Q_X$ is "1" or a beam-emission period $T_D$ if the bit $Q_X$ is "0." When the section 82 detects a 6-bit, pattern showing there are seven consecutive black pixels, it generates an emission-time signal SD which represents a beam-emission period $T_G$ if the bit $Q_X$ is "1" or a beam-emission period $T_D$ if the bit $Q_X$ is "0."

As is shown in the diagram shown in FIG. 36, $T_A < T_B < T_C < T_D < T_E < T_F < T_G$, and $T_G = T_1$.

The emission-time signal SD output by the section 82 is supplied to the second input terminal of the AND gate 83, to which the pixel signal SB (i.e., the bit $Q_D$) is also supplied. Hence, the AND gate 83 is turned on for the period of time represented by the emission-time signal SD and outputs a signal for this period of time. The output signal of the AND gate 83 is supplied to the drive section 67.

The drive section 67 outputs a drive signal SC which is at a high level for the period represented by the output signal of the AND gate 83, whereby the laser diode 62 keeps emitting a laser beam for this period of time.

As can be understood from FIGS. 34, 35 and 36, the period represented by the emission-time signal SD is proportional to the number of consecutive black pixels arranged in the main-scanning direction, provided that there are at most four consecutive black pixels including the pixel represented by the bit $Q_D$. When there are five to seven consecutive black pixels arranged in the main-scanning direction, the signal SD represents a period which is proportional to the number of consecutive black pixels if the three pixels represented by the bits $Q_H$, $Q_I$ and $Q_J$ and located above the three pixels represented by the bits $Q_C$, $Q_D$ and $Q_E$, respectively, are all black, and represents the same period, i.e., the period $T_D$, if the three pixels represented by the bits $Q_H$, $Q_I$ and $Q_J$ are not all black. Obviously, the longer the period the drive section 67 drives the laser diode 62, the larger the black pixel printed, which is represented by the bit $Q_D$.

To print a quasi-gray image or complex characters, which are defined by discrete black pixels, the laser diode 62 is repeatedly driven, each time for the period $T_A$ or $T_B$ and emitting a laser beam for this period, whereby discrete black pixels, each circumscribed by the one-pixel region or having a diameter longer than the side of the one-pixel region but not long enough to circumscribe the region, are formed ultimately on a printing medium. The black pixels, thus formed, define a clear-cut quasi-gray image or distinct characters.

On the other hand, to print a true black image, which is defined by overlapping black pixels, the laser diode 62 is repeatedly driven, each time for the period $T_C$ (i.e., one-pixel scanning period $T_1$) and emitting for the period $T_C$, whereby black pixels, each circumscribing the one-pixel region and overlapping another, are formed ultimately on a printing medium. The black pixels, thus formed, define a true black image.

The present invention in not limited to the embodiments described above. The following modifications can be made.

First, The number and arrangement of pixels, the pattern of which is detected, are not limited to those adopted in the embodiments described above. Further, these pixels need not be consecutive; they can be spaced away from one another.

Second, to print pixels of different sizes, it is possible to change the intensity of the laser beam or the voltage applied to the heating resistor, instead of changing the period during which to apply a laser beam of a fixed intensity to the drum 7 or the period during which to apply a fixed voltage to any heating resistor.

Third, the emission-time setting section can set two different periods, four to six different periods, or more different periods during which to drive the laser diode or apply a voltage to any heating resistor, instead of three or seven different periods.

Fourth, the invention can be applied to an ink-jet printer, an LED printer, or LCD printer, instead of a laser printer and a thermal printer. The technical concepts common to the first, third, fifth, seventh and ninth embodiments is suitable for an ink-jet printer, and the technical concept common to the second, third, sixth and eighth embodiments is suitable for an LED printer or an LCD printer.

Fifth, the first, third, fifth, seventh and ninth embodiments can easily be modified into laser printers of positive developing type, merely by inverting logic with respect to the values of bits representing pixels.

Other various changes and modifications can be made, without departing the scope of the present invention.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A printer for printing an image of two-dimensionally arranged pixels, comprising:
   pixel-forming means for forming a number of pixels on a printing medium two-dimensionally, in accordance with image data consisting of pixel-data items representing black pixels and white pixels;
   pixel-size setting means for setting a size of the pixel corresponding to a specified pixel-data item of the image data, by recognizing the states of the pixel-data items arranged in a scanning direction and including said specified pixel-data item, and similarly setting the sizes of the other pixels by changing said specified pixel-data item among the pixel-data items; and
   pixel-formation control means for controlling the pixel-forming means so as to form the pixel of a pixel size set by the pixel-size setting means on the basis of each pixel-data item, when the pixels are formed in accordance with the pixel-data items of the image data.

2. The printer according to claim 1, wherein the states of the pixel-data items arranged in a scanning direction and including said specified pixel-data item are recognized by recognizing the number of consecutive pixel-data items representing the black pixels including the specified pixel-data item.

3. The printer according to claim 1, wherein said control means changes time for forming one pixel, thereby to cause said pixel-forming means to form the given pixel which has size set by said pixel-size setting means.

4. The printer according to claim 1, wherein said control means changes energy for forming one pixel, thereby to cause said pixel-forming means to form the given pixel which has the size set by said pixel-size setting means.

5. The printer according to claim 1, wherein said pixel-forming means is a light-emitting element.

6. The printer according to claim 1, wherein said pixel-forming means comprises heating elements.

7. A printer for printing an image of two-dimensionally arranged pixels, comprising:
   pixel-forming means for forming a number of pixels on a printing medium two-dimensionally, in accordance with image data consisting of pixel-data items representing black pixels and white pixels;
   pixel-size setting means for setting a size of the pixel corresponding to a specified pixel-data item of the image data, by recognizing the states of the pixel-data items arranged in a direction perpendicular to a scanning direction and including said specified pixel-data item, and similarly setting the sizes of the other pixels by changing said specified pixel-data item among the pixel-data items; and
   pixel-formation control means for controlling the pixel-forming means so as to form the pixel of a pixel size set by the pixel-size setting means on the basis of each pixel-data item, when the pixels are formed in accordance with the pixel-data items of the image data.

8. The printer according to claim 2, wherein said control means changes time for forming one pixel, thereby to cause said pixel-forming means to form the given pixel which has size set by said pixel-size setting means.

9. The printer according to claim 2, wherein said control means changes energy for forming one pixel, thereby to cause said pixel-forming means to form the given pixel which has the size set by said pixel-size setting means.

10. The printer according to claim 2, wherein said pixel-forming means is a light-emitting element.

11. The printer according to claim 2, wherein said pixel-forming means comprises heating elements.

12. A printer for printing an image of two-dimensionally arranged pixels, comprising:
   pixel-forming means for forming a number of pixels on a printing medium two-dimensionally, in accordance with image data consisting of pixel-data items representing black pixels and white pixels;
   pixel-size setting means for setting a size of the pixel corresponding to a specified pixel-data item of the image data, by recognizing the states of the pixel-data items arranged in a scanning direction and in a direction perpendicular to the scanning direction and including said specified pixel-data item, and similarly setting the sizes of the other pixels by changing said specified pixel-data item among the pixel-data items; and pixel-formation control means for controlling the pixel-forming means so as to form the pixel of a pixel size set by the pixel-size setting means on the basis of each pixel-data item, when the pixels are formed in accordance with the pixel-data items of the image data.

13. The printer according to claim 12, wherein said control means changes time for forming one pixel, thereby to cause said pixel-forming means to form the given pixel which has size set by said pixel-size setting means.

14. The printer according to claim 12, wherein said control means changes energy for forming one pixel, thereby to cause said pixel-forming means to form the given pixel which has the size set by said pixel-size setting means.

15. The printer according to claim 12, wherein said pixel-forming means is a light-emitting element.

16. The printer according to claim 12, wherein said pixel-forming means comprises heating elements.

17. A printer for printing an image of two-dimensionally arranged pixels, comprising:

pixel-forming means for forming a number of pixels on a printing medium two-dimensionally, in accordance with image data consisting of pixel-data items representing black pixels and white pixels;

pixel-size setting means for setting a size of the pixel corresponding to a specified pixel-data item of the image data, by recognizing the states of the pixel-data items arranged in a scanning direction, a direction perpendicular to the scanning direction and a direction oblique to the scanning direction and including said specified pixel-data item, and similarly setting the sizes of the other pixels by changing said specified pixel-data item among the pixel-data items, and pixel-formation control means for controlling the pixel-forming means so as to form the pixel of a pixel size set by the pixel-size setting means on the basis of each pixel-data item, when the pixels are formed in accordance with the pixel-data items of the image data.

18. The printer according to claim 17, wherein said control means changes time for forming one pixel, thereby to cause said pixel-forming means to form the given pixel which has size set by said pixel-size setting means.

19. The printer according to claim 17, wherein said control means changes energy for forming one pixel, thereby to cause said pixel-forming means to form the given pixel which has the size set by said pixel-size setting means.

20. The printer according to claim 17, wherein said pixel-forming means is a light-emitting element.

21. The printer according to claim 17, wherein said pixel-forming means comprises heating elements.

22. A method of printing an image of two-dimensionally arranged pixels on a printing medium in accordance with image data consisting of pixel-data items representing black pixels and white pixels, comprising the steps of:

setting a size of the pixel corresponding to a specified pixel-data item of the image data, by recognizing the states of the pixel-data items arranged in a scanning direction and including said specified pixel-data item, and similarly setting the sizes of the other pixels by changing said specified pixel-data item among the pixel-data items; and controlling the pixel-forming means so as to form the pixel of a pixel size set by the pixel-size setting means on the basis of each pixel-data item, when the pixels are formed in accordance with the pixel-data items of the image data.

23. A method of printing an image of two-dimensionally arranged pixels on a printing medium in accordance with image data consisting of pixel-data items representing black pixels and white pixels, comprising the steps of:

setting a size of the pixel corresponding to a specified pixel-data item of the image data, by recognizing the states of the pixel-data items arranged in a direction perpendicular to a scanning direction and including said specified pixel-data item, and similarly setting the sizes of the other pixels by changing said specified pixel-data item among the pixel-data items; and controlling the pixel-forming means so as to form the pixel of a pixel size set by the pixel-size setting means on the basis of each pixel-data item, when the pixels are formed in accordance with the pixel-data items of the image data.

24. A method of printing an image of two-dimensionally arranged pixels on a printing medium in accordance with image data consisting of pixel-data items representing black pixels and white pixels, comprising the steps of:

setting a size of the pixel corresponding to a specified pixel-data item of the image data, by recognizing the states of the pixel-data items arranged in a scanning direction and a direction perpendicular to the scanning direction and including said specified pixel-data item, and similarly setting the sizes of the other pixels by changing said specified pixel-data item among the pixel-data items; and controlling the pixel-forming means so as to form the pixel of a pixel size set by the pixel-size setting means on the basis of each pixel-data item, when the pixels are formed in accordance with the pixel-data items of the image data.

25. A method of printing an image of two-dimensionally arranged pixels on a printing medium in accordance with image data consisting of pixel-data items representing black pixels and white pixels, comprising the steps of:

setting a size of the pixel corresponding to a specified pixel-data item of the image data, by recognizing the states of the pixel-data items arranged in a scanning direction, a direction perpendicular to the scanning direction and a direction oblique to the scanning direction and including said specified pixel-data item, and similarly setting the sizes of the other pixels by changing said specified pixel-data item among the pixel-data items; and controlling the pixel-forming means so as to form the pixel of a pixel size set by the pixel-size setting means on the basis of each pixel-data item, when the pixels are formed in accordance with the pixel-data items of the image data.

* * * * *

UNITED STATES PATENT AND TRADEMARK OFFICE
CERTIFICATE OF CORRECTION

PATENT NO. : 5,278,581
DATED : January 11, 1994
INVENTOR(S) : Hirotaka Fukuyama, et al.

It is certified that error appears in the above-indentified patent and that said Letters Patent is hereby corrected as shown below:

Claim 8, column 36, line 44, change "claim 2" to --claim 7--.

Claim 9, column 36, line 49, change "claim 2" to --claim 7--.

Claim 10, column 36, line 54, change "claim 2" to --claim 7--.

Claim 11, column 36, line 56, change "claim 2" to --claim 7--.

Signed and Sealed this

Fourteenth Day of February, 1995

Attest:

BRUCE LEHMAN

*Attesting Officer*          *Commissioner of Patents and Trademarks*